US012383066B2

(12) United States Patent
Pinkelman et al.

(10) Patent No.: US 12,383,066 B2
(45) Date of Patent: Aug. 12, 2025

(54) CHAIR WITH SHAPE MEMORY MATERIAL-BASED MOVEMENT SYNCHRONIZED WITH VISUAL CONTENT

(71) Applicant: Toyota Motor Engineering & Manufacturing North America, Inc., Plano, TX (US)

(72) Inventors: Brian J. Pinkelman, Ann Arbor, MI (US); Michael Paul Rowe, Pinckney, MI (US); Ryohei Tsuruta, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 473 days.

(21) Appl. No.: 17/729,522

(22) Filed: Apr. 26, 2022

(65) Prior Publication Data

US 2023/0337827 A1   Oct. 26, 2023

(51) Int. Cl.
*A47C 7/14* (2006.01)
*A47C 15/00* (2006.01)
*A63F 13/285* (2014.01)

(52) U.S. Cl.
CPC ............ *A47C 7/144* (2018.08); *A47C 15/004* (2013.01); *A63F 13/285* (2014.09)

(58) Field of Classification Search
None
See application file for complete search history.

(56) References Cited

U.S. PATENT DOCUMENTS

| 1,658,669 A | 2/1928 | Cohn et al. |
| 2,322,755 A | 6/1943 | Voorhies |

(Continued)

FOREIGN PATENT DOCUMENTS

| CN | 201037277 | 3/2008 |
| CN | 101367433 A | 2/2009 |

(Continued)

OTHER PUBLICATIONS

International Searching Authority, International Search Report and Written Opinion for International Patent Application No. PCT/US2023/019798, dated Aug. 9, 2023 (11 pages).

(Continued)

*Primary Examiner* — Timothy J Brindley
(74) *Attorney, Agent, or Firm* — Christopher G. Darrow; Darrow Mustafa PC

(57) ABSTRACT

A chair can be configured for synchronized movement with visual content, such as a video game or movie, presented on a display. The chair can include a seat portion. A plurality of actuators can be operatively positioned to cause a movement of the seat portion. The actuators can include one or more shape memory material members. Each of the actuators being configured such that, when an activation input is provided to the one or more shape memory material members, the one or more shape memory material members change from a first configuration to a second configuration and cause the actuator to morph into an activated configuration. One or more processors operatively connected to selectively activate one or more of the actuators by causing the activation input to be provided to the one or more shape memory material members of at least one of the actuators.

24 Claims, 8 Drawing Sheets

(56) References Cited

U.S. PATENT DOCUMENTS

| | | |
|---|---|---|
| 2,588,706 A | 3/1952 | Davis |
| 3,394,631 A | 7/1968 | Thompson |
| 3,706,102 A | 12/1972 | Grenier |
| 4,063,826 A | 12/1977 | Riepe |
| 4,244,140 A | 1/1981 | Kim |
| 4,396,220 A | 8/1983 | Dieckmann et al. |
| 4,498,851 A | 2/1985 | Kolm et al. |
| 4,522,447 A | 6/1985 | Snyder et al. |
| 4,541,885 A | 9/1985 | Caudill, Jr. |
| 4,544,988 A | 10/1985 | Hochstein |
| 4,553,393 A | 11/1985 | Ruoff |
| 4,595,338 A | 6/1986 | Kolm et al. |
| 4,779,852 A | 10/1988 | Wassell |
| 4,780,062 A | 10/1988 | Yamada et al. |
| 4,806,815 A | 2/1989 | Homma |
| 4,811,564 A | 3/1989 | Palmer |
| 4,834,619 A | 5/1989 | Walton |
| 4,898,426 A | 2/1990 | Schulz et al. |
| 4,923,000 A | 5/1990 | Nelson |
| 4,944,755 A | 7/1990 | Hennequin et al. |
| 4,955,196 A | 9/1990 | Lin et al. |
| 4,964,402 A | 10/1990 | Grim et al. |
| 5,069,219 A | 12/1991 | Knoblich |
| 5,088,115 A | 2/1992 | Napolitano |
| 5,129,753 A | 7/1992 | Wesley et al. |
| 5,250,167 A | 10/1993 | Adolf et al. |
| 5,255,390 A | 10/1993 | Gross et al. |
| 5,279,123 A | 1/1994 | Wechsler et al. |
| 5,482,351 A | 1/1996 | Young et al. |
| 5,488,255 A | 1/1996 | Sato et al. |
| 5,522,712 A | 6/1996 | Winn |
| 5,583,844 A | 12/1996 | Wolf et al. |
| 5,619,177 A | 4/1997 | Johnson et al. |
| 5,622,482 A | 4/1997 | Lee |
| 5,662,376 A | 9/1997 | Breuer et al. |
| 5,678,247 A | 10/1997 | Vickers |
| 5,686,003 A | 11/1997 | Ingram et al. |
| 5,747,140 A | 5/1998 | Heerklotz |
| 5,771,742 A | 6/1998 | Bokaie et al. |
| 5,846,629 A | 12/1998 | Gwinn |
| 5,853,005 A | 12/1998 | Scanlon |
| 5,861,703 A | 1/1999 | Losinski |
| 6,043,978 A | 3/2000 | Mody et al. |
| 6,053,553 A | 4/2000 | Hespelt |
| 6,093,910 A | 7/2000 | McClintock et al. |
| 6,116,257 A | 9/2000 | Yokota et al. |
| 6,142,563 A | 11/2000 | Townsend et al. |
| 6,155,716 A | 12/2000 | Okamura et al. |
| 6,186,047 B1 | 2/2001 | Baruffaldi |
| 6,227,515 B1 | 5/2001 | Broyles |
| 6,379,393 B1 | 4/2002 | Mavroidis et al. |
| 6,394,001 B1 | 5/2002 | Giesey et al. |
| 6,404,098 B1 | 6/2002 | Kayama et al. |
| 6,422,010 B1 | 7/2002 | Julien |
| 6,443,524 B1 | 9/2002 | Yu |
| 6,481,799 B1 | 11/2002 | Whalen |
| 6,508,437 B1 | 1/2003 | Davis et al. |
| 6,530,217 B1 | 3/2003 | Yokota et al. |
| 6,546,806 B1 | 4/2003 | Varma |
| 6,591,188 B1 | 7/2003 | Ohler |
| 6,628,522 B2 | 9/2003 | Trautman et al. |
| 6,664,718 B2 | 12/2003 | Perline et al. |
| 6,719,694 B2 | 4/2004 | Weng et al. |
| 6,740,994 B2 | 5/2004 | Lee et al. |
| 6,773,535 B1 | 8/2004 | Wetzel |
| 6,809,462 B2 | 10/2004 | Pelrine et al. |
| 6,896,324 B1 | 5/2005 | Kull et al. |
| 6,910,714 B2 | 6/2005 | Browne et al. |
| 6,912,748 B2 | 7/2005 | VanSickle |
| 6,943,653 B2 | 9/2005 | Hanke et al. |
| 6,972,659 B2 | 12/2005 | von Behrens et al. |
| 6,998,546 B1 | 2/2006 | Schmidt et al. |
| 7,017,345 B2 | 3/2006 | Von Behrens et al. |
| 7,086,322 B2 | 8/2006 | Schulz |
| 7,093,903 B2 | 8/2006 | O'Connor et al. |
| 7,100,990 B2 | 9/2006 | Kimura et al. |
| 7,108,316 B2 | 9/2006 | Barvosa-Carter et al. |
| 7,117,673 B2 | 10/2006 | Szilagyi |
| 7,125,077 B2 | 10/2006 | Frank |
| 7,204,472 B2 | 4/2007 | Jones et al. |
| 7,237,847 B2 | 7/2007 | Hancock et al. |
| 7,256,518 B2 | 8/2007 | Gummin |
| 7,293,836 B2 | 11/2007 | Browne et al. |
| 7,306,187 B2 | 12/2007 | Lavan |
| 7,309,104 B2 | 12/2007 | Browne et al. |
| 7,331,616 B2 | 2/2008 | Brei et al. |
| 7,336,486 B2 | 2/2008 | Mongia |
| 7,350,851 B2 | 4/2008 | Barvosa-Carter et al. |
| 7,364,211 B2 | 4/2008 | Niskanen et al. |
| 7,371,052 B2 | 5/2008 | Koeneman |
| 7,446,450 B2 | 11/2008 | Boland et al. |
| 7,448,678 B2 | 11/2008 | Browne et al. |
| 7,476,224 B2 | 1/2009 | Petrakis |
| 7,478,845 B2 | 1/2009 | Mankame et al. |
| 7,484,735 B2 | 2/2009 | Verbrugge et al. |
| 7,501,607 B2 | 3/2009 | Camm et al. |
| 7,506,937 B2 | 3/2009 | Bequet |
| 7,511,402 B2 | 3/2009 | Ito et al. |
| 7,527,312 B1 | 5/2009 | Cucknell et al. |
| 7,556,313 B2 | 7/2009 | Browne et al. |
| 7,578,661 B2 | 8/2009 | Koeneman |
| 7,594,697 B2 | 9/2009 | Browne et al. |
| 7,619,894 B2 | 11/2009 | Wang et al. |
| 7,661,764 B2 | 2/2010 | Ali et al. |
| 7,709,995 B2 | 5/2010 | Hanlon et al. |
| 7,717,520 B2 | 5/2010 | Boren et al. |
| 7,729,828 B2 | 6/2010 | Gandhi |
| 7,731,279 B2 | 6/2010 | Asada et al. |
| 7,735,940 B2 | 6/2010 | Chiu |
| 7,756,246 B2 | 7/2010 | Mikami et al. |
| 7,758,121 B2 | 7/2010 | Browne et al. |
| 7,766,423 B2 | 8/2010 | Alexander et al. |
| 7,770,391 B2 | 8/2010 | Melz |
| 7,814,810 B2 | 10/2010 | Mitteer |
| 7,823,382 B2 | 11/2010 | Ukpai et al. |
| 7,823,972 B2 | 11/2010 | Browne et al. |
| 7,834,527 B2 | 11/2010 | Rivera et al. |
| 7,878,459 B2 | 2/2011 | Mabe et al. |
| 7,883,148 B2 | 2/2011 | Alexander et al. |
| 7,892,630 B1 | 2/2011 | McKnight et al. |
| 7,901,524 B1 | 3/2011 | McKnight et al. |
| 7,905,538 B2 | 3/2011 | Ukpai et al. |
| 7,905,547 B2 | 3/2011 | Lawall et al. |
| 7,909,403 B2 | 3/2011 | Lawall et al. |
| 7,964,290 B2 | 6/2011 | Mullner et al. |
| 7,965,509 B2 | 6/2011 | Campbell et al. |
| 7,971,296 B2 | 7/2011 | Jansen |
| 7,971,939 B2 | 7/2011 | Fujita et al. |
| 8,016,952 B2 | 9/2011 | Ishida et al. |
| 8,038,215 B2 | 10/2011 | Di Giusto et al. |
| 8,052,112 B2 | 11/2011 | Lawall et al. |
| 8,056,335 B1 | 11/2011 | Brown |
| 8,100,471 B2 | 1/2012 | Lawall et al. |
| 8,109,567 B2 | 2/2012 | Alexander et al. |
| 8,126,615 B2 | 2/2012 | McMillen et al. |
| 8,172,458 B2 | 5/2012 | Petrakis |
| 8,240,677 B2 | 8/2012 | Browne et al. |
| 8,313,108 B2 | 11/2012 | Ac et al. |
| 8,362,882 B2 | 1/2013 | Heubel et al. |
| 8,366,057 B2 | 2/2013 | Vos et al. |
| 8,414,366 B2 | 4/2013 | Browne et al. |
| 8,446,475 B2 | 5/2013 | Topliss et al. |
| 8,448,435 B2 | 5/2013 | Gregory et al. |
| 8,510,924 B2 | 8/2013 | Mankame et al. |
| 8,584,456 B1 | 11/2013 | McKnight |
| 8,585,456 B2 | 11/2013 | Canon |
| 8,593,568 B2 | 11/2013 | Topliss et al. |
| 8,649,242 B2 | 2/2014 | Martin et al. |
| 8,681,496 B2 | 3/2014 | Dede |
| 8,695,334 B2 | 4/2014 | Lewis et al. |
| 8,702,120 B2 | 4/2014 | Kalisz et al. |
| 8,721,557 B2 | 5/2014 | Chen et al. |
| 8,741,076 B2 | 6/2014 | Gao et al. |
| 8,756,933 B2 | 6/2014 | Topliss et al. |

(56) References Cited

U.S. PATENT DOCUMENTS

| | | |
|---|---|---|
| 8,793,821 B2 | 8/2014 | Fowkes et al. |
| 8,827,709 B1 | 9/2014 | Gurule et al. |
| 8,830,335 B2 | 9/2014 | Topliss et al. |
| 8,853,916 B2 | 10/2014 | Browne et al. |
| 8,880,141 B2 | 11/2014 | Chen |
| 8,881,347 B2 | 11/2014 | Feinstein |
| 8,894,142 B2 | 11/2014 | Alexander et al. |
| 8,912,709 B2 | 12/2014 | Pollock et al. |
| 8,991,769 B2 | 3/2015 | Gandhi |
| 8,998,320 B2 | 4/2015 | Mankame et al. |
| 9,068,561 B2 | 6/2015 | Gondo |
| 9,086,069 B2 | 7/2015 | Dede |
| 9,140,243 B2 | 9/2015 | Gandhi et al. |
| 9,168,814 B2 | 10/2015 | Gandhi |
| 9,171,686 B2 | 10/2015 | Alacqua et al. |
| 9,180,525 B2 | 11/2015 | Park et al. |
| 9,267,495 B2 | 2/2016 | Kopfer et al. |
| 9,298,207 B2 | 3/2016 | Li |
| 9,347,609 B2 | 5/2016 | Pinto, IV et al. |
| 9,428,088 B1 | 8/2016 | Rajasingham |
| 9,457,813 B2 | 10/2016 | Hoerwick et al. |
| 9,457,887 B2 | 10/2016 | Roe et al. |
| 9,495,875 B2 | 11/2016 | Dowdall et al. |
| 9,512,829 B2 | 12/2016 | Alacqua et al. |
| 9,550,466 B2 | 1/2017 | Gandhi |
| 9,588,020 B2 | 3/2017 | Browne et al. |
| 9,662,197 B2 | 5/2017 | Yun et al. |
| 9,664,182 B2 | 5/2017 | Nicolini et al. |
| 9,664,210 B2 | 5/2017 | Ou et al. |
| 9,684,183 B2 | 6/2017 | Brown et al. |
| 9,696,175 B2 | 7/2017 | Hansen et al. |
| 9,697,708 B2 | 7/2017 | Adrezin et al. |
| 9,714,460 B2 | 7/2017 | Merideth |
| 9,719,534 B2 | 8/2017 | Shevchenko et al. |
| 9,731,828 B2 | 8/2017 | Lichota |
| 9,764,220 B2 | 9/2017 | Keating et al. |
| 9,784,249 B2 | 10/2017 | Li et al. |
| 9,784,590 B2 | 10/2017 | Englehardt et al. |
| 9,827,888 B2 | 11/2017 | Patrick et al. |
| 9,848,814 B2 | 12/2017 | Benson et al. |
| 9,943,437 B2 | 4/2018 | Lowe et al. |
| 9,945,490 B2 | 4/2018 | Dankbaar et al. |
| 9,981,421 B2 | 5/2018 | Macroe et al. |
| 9,994,136 B2 | 6/2018 | Nakada |
| 10,007,263 B1 | 6/2018 | Fields et al. |
| 10,029,618 B2 | 7/2018 | Perez Astudillo et al. |
| 10,059,334 B1 | 8/2018 | Zhu et al. |
| 10,061,350 B2 | 8/2018 | Magi |
| 10,066,829 B2 | 9/2018 | Wong et al. |
| 10,168,782 B1 | 1/2019 | Tchon et al. |
| 10,191,550 B1 | 1/2019 | Nussbaum et al. |
| 10,208,823 B2 | 2/2019 | Kashani |
| 10,299,520 B1 | 5/2019 | Shaffer et al. |
| 10,302,586 B2 | 5/2019 | Sun et al. |
| 10,315,771 B1 | 6/2019 | Rao et al. |
| 10,330,144 B1 | 6/2019 | Alqasimi et al. |
| 10,330,400 B2 | 6/2019 | Dede |
| 10,335,044 B2 | 7/2019 | Banet et al. |
| 10,349,543 B2 | 7/2019 | Sreetharan et al. |
| 10,355,624 B2 | 7/2019 | Majdi et al. |
| 10,371,229 B2 | 8/2019 | Gandhi et al. |
| 10,371,299 B2 | 8/2019 | Leffler |
| 10,377,278 B2 | 8/2019 | Ketels et al. |
| 10,427,634 B2 | 10/2019 | Gandhi et al. |
| 10,434,973 B2 | 10/2019 | Gandhi et al. |
| 10,441,491 B2 | 10/2019 | Wyatt et al. |
| 10,459,475 B2 | 10/2019 | Gandhi et al. |
| 10,479,246 B2 | 11/2019 | Meingast et al. |
| 10,532,672 B1 | 1/2020 | Pinkelman et al. |
| 10,583,757 B2 | 3/2020 | Ketels et al. |
| 10,591,078 B2 | 3/2020 | Oehler et al. |
| 10,647,237 B2 | 5/2020 | Song |
| 10,677,310 B2 | 6/2020 | Gandhi et al. |
| 10,682,931 B2 | 6/2020 | Rowe et al. |
| 10,759,320 B2 | 9/2020 | Mochizuki |
| 10,773,487 B2 | 9/2020 | Frigerio et al. |
| 10,781,800 B2 | 9/2020 | Brown et al. |
| 10,814,514 B2 | 10/2020 | Aihara |
| 10,843,611 B2 | 11/2020 | Caruss et al. |
| 10,933,974 B2 | 3/2021 | Tsuruta et al. |
| 10,960,793 B2 | 3/2021 | Gandhi et al. |
| 10,965,172 B2 | 3/2021 | Dede et al. |
| 10,993,526 B2 | 5/2021 | Vandewall et al. |
| 10,995,779 B2 | 5/2021 | Keplinger et al. |
| 11,048,329 B1 | 6/2021 | Lee et al. |
| 11,091,060 B2 | 8/2021 | Pinkelman et al. |
| 11,125,248 B2 | 9/2021 | Joshi et al. |
| 11,137,045 B2 | 10/2021 | Gandhi et al. |
| 11,180,052 B2 | 11/2021 | Severgnini et al. |
| 11,241,842 B2 | 2/2022 | Gandhi et al. |
| 11,247,584 B2 | 2/2022 | Breitweg et al. |
| 11,248,592 B1 | 2/2022 | Tsuruta et al. |
| 11,269,891 B2 | 3/2022 | Frank et al. |
| 11,285,844 B2 | 3/2022 | Gandhi et al. |
| 11,353,009 B2 | 6/2022 | Rowe et al. |
| 11,356,255 B1 | 6/2022 | Emelyanov et al. |
| 11,370,330 B2 | 6/2022 | Gandhi et al. |
| 11,372,481 B2 | 6/2022 | Leroy et al. |
| 11,377,007 B2 | 7/2022 | Samain et al. |
| 11,458,874 B2 | 10/2022 | Nagai et al. |
| 11,460,009 B1 | 10/2022 | Tsuruta et al. |
| 11,460,010 B1 | 10/2022 | Tsuruta et al. |
| 11,467,669 B2 | 10/2022 | Liu et al. |
| 11,472,325 B1 | 10/2022 | Tsuruta et al. |
| 11,486,421 B2 | 11/2022 | Keplinger et al. |
| 11,536,255 B1 | 12/2022 | Rowe |
| 11,542,925 B1 | 1/2023 | Rowe et al. |
| 11,577,471 B2 | 2/2023 | Gandhi et al. |
| 11,591,076 B2 | 2/2023 | Song et al. |
| 11,592,010 B1 | 2/2023 | Panwar et al. |
| 11,592,037 B1 | 2/2023 | Rowe et al. |
| 11,603,153 B1 | 3/2023 | Trager et al. |
| 11,603,828 B2 | 3/2023 | Gummin et al. |
| 11,624,376 B2 | 4/2023 | Rowe et al. |
| 11,628,898 B1 | 4/2023 | Trager et al. |
| 11,642,083 B2 | 5/2023 | Severgnini et al. |
| 11,649,808 B2 | 5/2023 | Tsuruta et al. |
| 11,668,287 B2 | 6/2023 | Naly et al. |
| 11,702,015 B2 | 7/2023 | Pinkelman et al. |
| 11,732,735 B2 | 8/2023 | Song et al. |
| 11,750,115 B2 | 9/2023 | Saneyoshi et al. |
| 11,752,901 B2 | 9/2023 | Gandhi et al. |
| 11,795,924 B2 | 10/2023 | Rowe |
| 11,840,161 B2 | 12/2023 | Schmalenberg et al. |
| 11,841,008 B1 | 12/2023 | Panwar et al. |
| 11,885,428 B2 | 1/2024 | Panwar et al. |
| 11,897,379 B2 | 2/2024 | Tsuruta et al. |
| 11,913,436 B2 | 2/2024 | Easton et al. |
| 11,927,206 B2 | 3/2024 | Rowe et al. |
| 2002/0130754 A1 | 9/2002 | Alacqua et al. |
| 2002/0179663 A1 | 12/2002 | Moore et al. |
| 2003/0000605 A1 | 1/2003 | Homma |
| 2003/0182041 A1 | 9/2003 | Watson |
| 2004/0035108 A1 | 2/2004 | Szilagyi |
| 2004/0041998 A1 | 3/2004 | Haddad |
| 2004/0104580 A1 | 6/2004 | Spiessl et al. |
| 2004/0118854 A1 | 6/2004 | Kutun |
| 2004/0145230 A1 | 7/2004 | Fujita et al. |
| 2004/0195888 A1 | 10/2004 | Frye |
| 2004/0256920 A1 | 12/2004 | Gummin et al. |
| 2004/0261411 A1 | 12/2004 | MacGregor |
| 2005/0023086 A1 | 2/2005 | Szilagyi |
| 2005/0066810 A1 | 3/2005 | Schulz |
| 2005/0082897 A1 | 4/2005 | Ropp et al. |
| 2005/0111177 A1 | 5/2005 | Kwitek |
| 2005/0146147 A1 | 7/2005 | Niskanen et al. |
| 2005/0198904 A1 | 9/2005 | Browne et al. |
| 2005/0199455 A1 | 9/2005 | Browne et al. |
| 2005/0199845 A1 | 9/2005 | Jones et al. |
| 2005/0206096 A1 | 9/2005 | Browne et al. |
| 2005/0210874 A1 | 9/2005 | Browne et al. |
| 2005/0211198 A1 | 9/2005 | Froeschle et al. |
| 2005/0227607 A1 | 10/2005 | Stevenson et al. |
| 2005/0253425 A1 | 11/2005 | Asada et al. |

(56) References Cited

U.S. PATENT DOCUMENTS

| | | |
|---|---|---|
| 2006/0033312 A1 | 2/2006 | Barvosa-Carter et al. |
| 2006/0038643 A1 | 2/2006 | Xu et al. |
| 2006/0038745 A1 | 2/2006 | Naksen et al. |
| 2006/0074325 A1 | 4/2006 | Karo et al. |
| 2006/0201149 A1 | 9/2006 | Biggs et al. |
| 2006/0223637 A1 | 10/2006 | Rosenberg |
| 2006/0226013 A1 | 10/2006 | Decre et al. |
| 2006/0244293 A1 | 11/2006 | Buffa |
| 2006/0265965 A1 | 11/2006 | Butera et al. |
| 2007/0025575 A1 | 2/2007 | Oser et al. |
| 2007/0046074 A1 | 3/2007 | Satta et al. |
| 2007/0063566 A1 | 3/2007 | Browne et al. |
| 2007/0084220 A1 | 4/2007 | Asada et al. |
| 2007/0188004 A1 | 8/2007 | Browne et al. |
| 2007/0205853 A1 | 9/2007 | Taya et al. |
| 2007/0236071 A1 | 10/2007 | Fujita et al. |
| 2007/0246285 A1 | 10/2007 | Browne et al. |
| 2007/0246898 A1 | 10/2007 | Keefe et al. |
| 2007/0246979 A1 | 10/2007 | Browne et al. |
| 2007/0271939 A1 | 11/2007 | Ichigaya |
| 2007/0277877 A1 | 12/2007 | Ghorbal et al. |
| 2008/0006353 A1 | 1/2008 | Elzey et al. |
| 2008/0018198 A1 | 1/2008 | Sohn et al. |
| 2008/0085436 A1 | 4/2008 | Langan et al. |
| 2008/0100118 A1 | 5/2008 | Young et al. |
| 2008/0114218 A1 | 5/2008 | Suyama et al. |
| 2008/0219501 A1 | 9/2008 | Matsumoto |
| 2008/0267770 A1 | 10/2008 | Webster et al. |
| 2008/0271559 A1 | 11/2008 | Garscha et al. |
| 2008/0272259 A1 | 11/2008 | Zavattieri et al. |
| 2008/0307786 A1 | 12/2008 | Hafez et al. |
| 2009/0008973 A1 | 1/2009 | Browne |
| 2009/0009656 A1 | 1/2009 | Honda et al. |
| 2009/0030576 A1 | 1/2009 | Periot et al. |
| 2009/0041085 A1 | 2/2009 | Petrakis |
| 2009/0108607 A1 | 4/2009 | Browne et al. |
| 2009/0115284 A1 | 5/2009 | Liang et al. |
| 2009/0131752 A1 | 5/2009 | Park |
| 2009/0143730 A1 | 6/2009 | De Polo et al. |
| 2009/0173305 A1 | 7/2009 | Alexander et al. |
| 2009/0212158 A1 | 8/2009 | Mabe et al. |
| 2009/0218858 A1 | 9/2009 | Lawall et al. |
| 2009/0218859 A1* | 9/2009 | Lawall ............... B60N 2/42763 297/284.1 |
| 2009/0224584 A1 | 9/2009 | Lawall et al. |
| 2009/0224587 A1 | 9/2009 | Lawall et al. |
| 2009/0241537 A1 | 10/2009 | Browne et al. |
| 2009/0242285 A1 | 10/2009 | Whetstone, Jr. |
| 2009/0283643 A1 | 11/2009 | Sar et al. |
| 2009/0284059 A1 | 11/2009 | Gupta et al. |
| 2010/0001568 A1 | 1/2010 | Trybus et al. |
| 2010/0027119 A1 | 2/2010 | Kollar et al. |
| 2010/0031525 A1 | 2/2010 | Allezy et al. |
| 2010/0036567 A1 | 2/2010 | Gandhi |
| 2010/0066142 A1 | 3/2010 | Gross et al. |
| 2010/0117663 A1 | 5/2010 | Herrera et al. |
| 2010/0192567 A1 | 8/2010 | Butera |
| 2010/0212312 A1* | 8/2010 | Rudduck ............ F03G 7/06143 60/527 |
| 2010/0221124 A1 | 9/2010 | Ikushima et al. |
| 2010/0244505 A1 | 9/2010 | Demick et al. |
| 2010/0275592 A1 | 11/2010 | Topliss et al. |
| 2010/0282902 A1 | 11/2010 | Rajasingham |
| 2010/0287965 A1 | 11/2010 | Bryant |
| 2010/0294476 A1 | 11/2010 | Gomi et al. |
| 2010/0308689 A1 | 12/2010 | Rahman et al. |
| 2010/0326070 A1 | 12/2010 | Hao et al. |
| 2011/0021932 A1 | 1/2011 | Kim et al. |
| 2011/0030380 A1 | 2/2011 | Widdle, Jr. et al. |
| 2011/0038727 A1 | 2/2011 | Vos et al. |
| 2011/0111839 A1 | 5/2011 | Lesley et al. |
| 2011/0120119 A1 | 5/2011 | Alexander et al. |
| 2011/0150669 A1 | 6/2011 | Frayne et al. |
| 2011/0179790 A1 | 7/2011 | Pretorius |
| 2011/0217031 A1 | 9/2011 | Eromaki |
| 2011/0300358 A1 | 12/2011 | Blohowiak et al. |
| 2012/0019216 A1 | 1/2012 | Lewis et al. |
| 2012/0049095 A1 | 3/2012 | Yamasaki |
| 2012/0056459 A1 | 3/2012 | Harden |
| 2012/0081337 A1 | 4/2012 | Camp, Jr. et al. |
| 2012/0109025 A1 | 5/2012 | Weinberg et al. |
| 2012/0136126 A1 | 5/2012 | Rousseau |
| 2012/0181896 A1 | 7/2012 | Kornbluh et al. |
| 2012/0232783 A1 | 9/2012 | Calkins et al. |
| 2012/0237309 A1 | 9/2012 | Park et al. |
| 2012/0239183 A1 | 9/2012 | Mankame et al. |
| 2012/0267928 A1 | 10/2012 | Mankame et al. |
| 2012/0276807 A1 | 11/2012 | Cabrera |
| 2012/0292155 A1 | 11/2012 | Gunter |
| 2012/0297763 A1 | 11/2012 | Mankame et al. |
| 2012/0319445 A1 | 12/2012 | Zolno et al. |
| 2013/0005442 A1 | 1/2013 | Erickson et al. |
| 2013/0011806 A1 | 1/2013 | Gao et al. |
| 2013/0043354 A1 | 2/2013 | Shome et al. |
| 2013/0075210 A1 | 3/2013 | Langbein et al. |
| 2013/0098029 A1 | 4/2013 | Pinto, IV et al. |
| 2013/0188313 A1 | 7/2013 | Dede |
| 2013/0205770 A1 | 8/2013 | Browne et al. |
| 2013/0227943 A1 | 9/2013 | Mance et al. |
| 2014/0130491 A1 | 5/2014 | Gandhi et al. |
| 2014/0168894 A1 | 6/2014 | Dede |
| 2014/0196633 A1 | 7/2014 | Shaw |
| 2014/0207333 A1 | 7/2014 | Vandivier et al. |
| 2014/0217792 A1 | 8/2014 | Meyer |
| 2014/0239677 A1* | 8/2014 | Laib .................. B64D 11/0626 297/180.1 |
| 2014/0250881 A1 | 9/2014 | Yamamoto |
| 2014/0265468 A1 | 9/2014 | Greenhill et al. |
| 2014/0265479 A1 | 9/2014 | Bennett |
| 2014/0277739 A1 | 9/2014 | Kornbluh et al. |
| 2014/0298794 A1 | 10/2014 | Flaschentrager et al. |
| 2014/0314976 A1 | 10/2014 | Niiyama et al. |
| 2014/0316269 A1 | 10/2014 | Zhang et al. |
| 2014/0333088 A1 | 11/2014 | Lang et al. |
| 2014/0338324 A1 | 11/2014 | Jasklowski |
| 2015/0016968 A1 | 1/2015 | Grabowska et al. |
| 2015/0130220 A1 | 5/2015 | Preisler et al. |
| 2015/0185764 A1 | 7/2015 | Magi |
| 2015/0197173 A1 | 7/2015 | Hulway |
| 2015/0202993 A1 | 7/2015 | Mankame et al. |
| 2015/0274078 A1 | 10/2015 | Alacqua et al. |
| 2015/0289994 A1 | 10/2015 | Engeberg et al. |
| 2015/0290015 A1 | 10/2015 | Elahinia et al. |
| 2015/0331488 A1 | 11/2015 | Grant et al. |
| 2015/0366350 A1 | 12/2015 | DiCenso et al. |
| 2016/0004298 A1 | 1/2016 | Mazed et al. |
| 2016/0032997 A1 | 2/2016 | Seepersad et al. |
| 2016/0061345 A1 | 3/2016 | Jackson, Jr. |
| 2016/0082984 A1 | 3/2016 | Schmidt |
| 2016/0084665 A1 | 3/2016 | Englehardt et al. |
| 2016/0123793 A1 | 5/2016 | Kollich et al. |
| 2016/0221475 A1 | 8/2016 | Sugiyama |
| 2016/0246374 A1 | 8/2016 | Carter et al. |
| 2016/0278459 A1 | 9/2016 | Hilty |
| 2016/0325837 A1 | 11/2016 | Erhel et al. |
| 2016/0345088 A1 | 11/2016 | Vilermo et al. |
| 2016/0375835 A1 | 12/2016 | Murray et al. |
| 2017/0116792 A1 | 4/2017 | Jelinek et al. |
| 2017/0121068 A1 | 5/2017 | Foshansky et al. |
| 2017/0123499 A1 | 5/2017 | Eid |
| 2017/0148102 A1 | 5/2017 | Franke et al. |
| 2017/0153707 A1 | 6/2017 | Subramanian et al. |
| 2017/0158104 A1 | 6/2017 | Le et al. |
| 2017/0166222 A1 | 6/2017 | James |
| 2017/0174236 A1 | 6/2017 | Worden et al. |
| 2017/0203432 A1 | 7/2017 | Andrianesis |
| 2017/0240075 A1 | 8/2017 | McCoy et al. |
| 2017/0252260 A1 | 9/2017 | Gummin et al. |
| 2017/0328384 A1 | 11/2017 | Goto et al. |
| 2017/0355288 A1 | 12/2017 | Barbat et al. |
| 2018/0001113 A1 | 1/2018 | Streeter |
| 2018/0012433 A1 | 1/2018 | Ricci |
| 2018/0036198 A1 | 2/2018 | Mergl et al. |
| 2018/0073491 A1 | 3/2018 | Gissen et al. |

(56) References Cited

U.S. PATENT DOCUMENTS

| | | |
|---|---|---|
| 2018/0084915 A1* | 3/2018 | Norman .................. A47C 5/04 |
| 2018/0115260 A1 | 4/2018 | Chiba et al. |
| 2018/0130347 A1 | 5/2018 | Ricci et al. |
| 2018/0132825 A1 | 5/2018 | Tachibana |
| 2018/0134191 A1 | 5/2018 | Ketels et al. |
| 2018/0141562 A1 | 5/2018 | Singhal |
| 2018/0149141 A1 | 5/2018 | Cullen et al. |
| 2018/0151035 A1 | 5/2018 | Maalouf et al. |
| 2018/0178808 A1 | 6/2018 | Zhao et al. |
| 2018/0249772 A1 | 9/2018 | Koo et al. |
| 2018/0251234 A1 | 9/2018 | Wang |
| 2018/0264975 A1 | 9/2018 | Bonk et al. |
| 2018/0281621 A1* | 10/2018 | Kaku ..................... B60N 2/914 |
| 2018/0286189 A1 | 10/2018 | Motamedi et al. |
| 2018/0321703 A1 | 11/2018 | Gandhi et al. |
| 2018/0345841 A1 | 12/2018 | Prokhorov et al. |
| 2018/0348759 A1 | 12/2018 | Freeman et al. |
| 2018/0355991 A1* | 12/2018 | Pfahler .................. B60N 2/914 |
| 2019/0005272 A1 | 1/2019 | Gault et al. |
| 2019/0023161 A1 | 1/2019 | Sullivan et al. |
| 2019/0039525 A1* | 2/2019 | Hu ........................ B60R 7/005 |
| 2019/0041986 A1 | 2/2019 | Rihn et al. |
| 2019/0042857 A1 | 2/2019 | Endo et al. |
| 2019/0059608 A1 | 2/2019 | Yan et al. |
| 2019/0061307 A1 | 2/2019 | Chen et al. |
| 2019/0083022 A1 | 3/2019 | Huang |
| 2019/0135150 A1 | 5/2019 | Gao et al. |
| 2019/0143869 A1 | 5/2019 | Sequi et al. |
| 2019/0154122 A1 | 5/2019 | Lima et al. |
| 2019/0197842 A1 | 6/2019 | Long et al. |
| 2019/0232842 A1 | 8/2019 | Boccuccia et al. |
| 2019/0291649 A1 | 9/2019 | Ito |
| 2020/0010001 A1 | 1/2020 | Pinkelman et al. |
| 2020/0015493 A1 | 1/2020 | Ergun et al. |
| 2020/0015593 A1 | 1/2020 | Norman et al. |
| 2020/0032822 A1 | 1/2020 | Keplinger et al. |
| 2020/0088175 A1 | 3/2020 | Li et al. |
| 2020/0112269 A1 | 4/2020 | Taghavi et al. |
| 2020/0179168 A1 | 6/2020 | Kelleher et al. |
| 2020/0197250 A1 | 6/2020 | Wyatt et al. |
| 2020/0223325 A1 | 7/2020 | Pinkelman et al. |
| 2020/0238854 A1 | 7/2020 | Gandhi et al. |
| 2020/0247274 A1 | 8/2020 | Gandhi et al. |
| 2020/0276971 A1 | 9/2020 | Takeda et al. |
| 2020/0282878 A1 | 9/2020 | Gandhi et al. |
| 2020/0298732 A1 | 9/2020 | Gandhi et al. |
| 2020/0307416 A1* | 10/2020 | Gandhi .................. B60N 2/68 |
| 2020/0309102 A1 | 10/2020 | Henderson et al. |
| 2020/0339242 A1 | 10/2020 | Tsuruta et al. |
| 2020/0377036 A1 | 12/2020 | Lee et al. |
| 2020/0378370 A1 | 12/2020 | Kopfer et al. |
| 2021/0095646 A1 | 4/2021 | Blecha et al. |
| 2021/0118597 A1 | 4/2021 | Pinkelman et al. |
| 2021/0132396 A1 | 5/2021 | Shin et al. |
| 2021/0153754 A1 | 5/2021 | Ozawa et al. |
| 2021/0162457 A1 | 6/2021 | Eberfors |
| 2021/0221269 A1* | 7/2021 | Baranowski ............. B60N 2/76 |
| 2021/0236061 A1 | 8/2021 | Severgnini et al. |
| 2021/0237809 A1 | 8/2021 | Rowe et al. |
| 2021/0265922 A1 | 8/2021 | Nakagawa |
| 2022/0001530 A1 | 1/2022 | Sameoto et al. |
| 2022/0012458 A1 | 1/2022 | Uetabira |
| 2022/0031178 A1 | 2/2022 | Brulet et al. |
| 2022/0106941 A1 | 4/2022 | Easton |
| 2022/0119202 A1 | 4/2022 | Morrissey et al. |
| 2022/0154703 A1 | 5/2022 | Shin et al. |
| 2022/0164079 A1 | 5/2022 | Severgnini et al. |
| 2022/0196109 A1 | 6/2022 | Gandhi et al. |
| 2022/0242328 A1 | 8/2022 | Pinkelman et al. |
| 2022/0258656 A1 | 8/2022 | Little |
| 2022/0289077 A1* | 9/2022 | Schmalenberg ....... G06Q 10/02 |
| 2022/0299016 A1 | 9/2022 | Tsuruta et al. |
| 2022/0307485 A1 | 9/2022 | Gummin et al. |
| 2022/0314857 A1 | 10/2022 | Tsuruta et al. |
| 2022/0316458 A1 | 10/2022 | Tsuruta et al. |
| 2022/0412325 A1 | 12/2022 | Köpfer et al. |
| 2023/0078040 A1 | 3/2023 | Rowe et al. |
| 2023/0088911 A1 | 3/2023 | Song et al. |
| 2023/0119407 A1 | 4/2023 | Sugiyama et al. |
| 2023/0120436 A1 | 4/2023 | Tsuruta et al. |
| 2023/0124526 A1 | 4/2023 | Tsuruta et al. |
| 2023/0136197 A1 | 5/2023 | Gilmore et al. |
| 2023/0179122 A1 | 6/2023 | Palaniswamy et al. |
| 2023/0191953 A1 | 6/2023 | Panwar et al. |
| 2023/0193929 A1 | 6/2023 | Rowe et al. |
| 2023/0287871 A1 | 9/2023 | Rowe |
| 2023/0312109 A1 | 10/2023 | Joshi et al. |
| 2023/0331371 A1 | 10/2023 | Gupta et al. |
| 2023/0331372 A1 | 10/2023 | Gupta et al. |
| 2023/0337827 A1 | 10/2023 | Pinkelman et al. |
| 2024/0060480 A1 | 2/2024 | Panwar et al. |

FOREIGN PATENT DOCUMENTS

| | | |
|---|---|---|
| CN | 101417152 A | 4/2009 |
| CN | 102333504 A | 1/2012 |
| CN | 102152309 B | 11/2012 |
| CN | 103038094 A | 4/2013 |
| CN | 103147511 | 6/2013 |
| CN | 103147511 A | 6/2013 |
| CN | 102026842 B | 7/2013 |
| CN | 103935495 A | 7/2014 |
| CN | 102765354 B | 11/2014 |
| CN | 104290617 A | 1/2015 |
| CN | 204774820 U | 11/2015 |
| CN | 105517664 A | 4/2016 |
| CN | 106168523 A | 11/2016 |
| CN | 206029888 U | 3/2017 |
| CN | 107111473 A | 8/2017 |
| CN | 105946515 B | 4/2018 |
| CN | 108100228 A | 6/2018 |
| CN | 108819806 A | 11/2018 |
| CN | 106014897 B | 12/2018 |
| CN | 106956254 B | 3/2019 |
| CN | 109572966 A | 4/2019 |
| CN | 209010975 U | 6/2019 |
| CN | 105003405 B | 7/2019 |
| CN | 107485536 B | 1/2020 |
| CN | 112411375 A | 2/2021 |
| CN | 115706489 A | 2/2023 |
| DE | 10155119 A1 | 5/2003 |
| DE | 20309196 U1 | 11/2003 |
| DE | 10222022 A1 | 12/2003 |
| DE | 102010021902 A1 | 12/2011 |
| DE | 102016210214 A1 | 12/2017 |
| DE | 102019204866 A1 | 10/2020 |
| DE | 102008021679 B4 | 1/2021 |
| EP | 1420094 A1 | 5/2004 |
| EP | 1519055 A2 | 3/2005 |
| EP | 1904337 B1 | 10/2010 |
| EP | 2723069 A1 | 4/2014 |
| EP | 3196484 A1 | 7/2017 |
| FR | 3058108 A1 | 5/2018 |
| JP | S5870892 U | 5/1983 |
| JP | S61277898 A | 12/1986 |
| JP | H03276698 A | 12/1991 |
| JP | H06033895 A | 6/1994 |
| JP | 09-133069 A | 5/1997 |
| JP | H09168285 A | 6/1997 |
| JP | H10337061 A | 12/1998 |
| JP | 2003276698 A | 10/2003 |
| JP | 3706899 B2 | 10/2005 |
| JP | 2006000347 A | 1/2006 |
| JP | 2006006581 A | 1/2006 |
| JP | 2006248456 A | 9/2006 |
| JP | 2008014470 A | 1/2008 |
| JP | 2008138558 A | 6/2008 |
| JP | 2008154447 A | 7/2008 |
| JP | 4273902 B2 | 6/2009 |
| JP | 2009162233 A | 7/2009 |
| JP | 2010117457 A | 5/2010 |
| JP | 4576281 B2 | 11/2010 |
| JP | 5760241 | 8/2015 |
| JP | 2017175155 A | 9/2017 |

(56) References Cited

FOREIGN PATENT DOCUMENTS

| | | |
|---|---|---|
| JP | 2018188035 A | 11/2018 |
| JP | 2019094789 A | 6/2019 |
| JP | 2019101988 A | 6/2019 |
| JP | 2020090181 A | 6/2020 |
| JP | 2021107221 A | 7/2021 |
| KR | 19980044089 U | 9/1998 |
| KR | 20050056526 A | 6/2005 |
| KR | 1020130005989 | 1/2013 |
| KR | 101395364 B1 | 5/2014 |
| KR | 101861620 B1 | 4/2018 |
| KR | 1020180074003 A | 7/2018 |
| KR | 101931791 B1 | 12/2018 |
| KR | 20210052091 A | 5/2021 |
| KR | 20210086518 A | 7/2021 |
| KR | 102298464 B1 | 9/2021 |
| WO | 02011648 A1 | 2/2002 |
| WO | 2005004321 A1 | 1/2005 |
| WO | 2009079668 A2 | 6/2009 |
| WO | 2009111362 A2 | 9/2009 |
| WO | 2011017071 A2 | 2/2011 |
| WO | 2011111769 A1 | 9/2011 |
| WO | 2014145018 A2 | 9/2014 |
| WO | 2014172320 A1 | 10/2014 |
| WO | 2015037600 A1 | 3/2015 |
| WO | 2016017057 A1 | 2/2016 |
| WO | 2016130719 A2 | 8/2016 |
| WO | 2017077541 A1 | 5/2017 |
| WO | 2019043599 A1 | 3/2019 |
| WO | 2019097437 A1 | 5/2019 |
| WO | 2019173227 A1 | 9/2019 |
| WO | 2020110091 A2 | 6/2020 |
| WO | 2020183360 A1 | 9/2020 |
| WO | 2021118185 A2 | 6/2021 |

OTHER PUBLICATIONS

Ou et al., "jamSheets: Thin Interfaces with Tunable Stiffness Enabled by Layer Jamming," Proceedings of the 8th International Conference on Tangible, Embedded, and Embodied Interaction, 2014 (8 pages).

Ou et al., "aeroMorph—Heat-sealing Inflatable Shape-change Materials for Interaction Design," Proceedings of the 29th Annual Symposium on User Interface Software and Technology (2016) pp. 121-132 (10 pages).

Rowe et al., U.S. Appl. No. 18/468,029, filed Sep. 15, 2023.

Jani et al., "A review of shape memory alloy research, applications, and opportunities", Elsevier, 2014, pp. 1078-1113 (36 pages).

Tiseo et al., "A Shape Memory Alloy Based Tuneable Dynamic Vibration Absorber for Vibration Tonal Control", Journal of Theoretical and Applied Mechanics, 2010, pp. 135-153 (19 pages).

Williams et al., "Dynamic modelling of a shape memory alloy adaptive tuned vibration absorber", Elsevier, Journal of Vibration and Sound, 2005, pp. 211-234 (24 pages).

Araki et al., "Integrated mechanical and material design of quasi-zero-stiffness vibration isolator with superelastic Cu—Al—Mn shape memory alloy bars", Journal of Sound and Vibration, 2015 (34 pages).

Casciati et al., "Performance of a base isolator with shape memory alloy bars", Earthquake Engineering and Engineering Vibration, Dec. 2007 (8 pages).

Miga Motor Company, "Miga AdrenaLine—A Space Age Wire," retrieved from the Internet: <https://migamotors.com/index.php?main_page=product_info&cPath=1&products_id=37>, [retrieved Mar. 26, 2021] (1 page).

Furukawa Techno Material, "Shape Memory Alloys & Super-elastic Alloys," retrieved from the Internet: <https://www.furukawa-ftm.com/english/nt-e/product.htm>, [retrieved Mar. 26, 2021] (3 pages).

Gilmore et al., U.S. Appl. No. 17/514,075, filed Oct. 29, 2021.

Song et al., "Resistance Modelling of SMA Wire Actuators", Canadian Institute for NDE, International Workshop: Smart Materials, Structures & NDT in Aerospace Conference, Nov. 2011 (10 pages).

Rowe et al., U.S. Appl. No. 18/452,602, filed Aug. 21, 2023.

Motzki, "Efficient SMA Actuation—Design and Control Concepts", Proceedings, vol. 64, No. 1, MDPI, 2020 (9 pages).

Arduino Documentation, "Secrets of Arduino PWM", last revision May 27, 2024, retrieved from the Internet: <https://docs.arduino.cc/tutorials/generic/secrets-of-arduino-pwm/>, [retrieved Jun. 1, 2024] (13 pages).

Barbarino et al., "A review on shape memory alloys with applications to morphing aircraft", Smart Materials and Structures, Apr. 2014 (19 pages).

"HapWRAP: Soft Growing Wearable Haptic Device", retrieved from the Internet: <https://smartdevicess.createdsites.com>, dated May 27, 2019 (18 pages).

Yilmaz et al., "Detecting Vital Signs with Wearable Wireless Sensors", Sensors, Dec. 2010 (26 pages).

Choi et al. "Highly conductive, stretchable, and biocompatible Ag—Au core-sheath nanowire composite for wearable and implantable bioelectronics", Nature Nanotechnology 13, No. 11, 2018 (36 pages).

Gao et al., "Wearable Microfluidic Diaphragm Pressure Sensor for Health and Tactile Touch Monitoring", Advanced Materials, Oct. 2017 (15 pages).

Kweon et al., "Wearable high-performance pressure sensors based on three-dimensional electrospun conductive nanofibers", NPG Asia Materials 2018 (12 pages).

Wang et al. "Monitoring of the central blood pressure waveform via a conformal ultrasonic device", Nat Biomed Eng, Sep. 2018 (22 pages).

Agharese et al. "hapWRAP: Soft Growing Wearable Haptic Device", 2018 IEEE International Conference on Robotics and Automation (ICRA), May 2018 (7 pages).

Gao et al., "Fully integrated wearable sensor arrays for multiplexed in situ perspiration analysis", Nature, Jan. 2016 (30 pages).

Jitosho et al. "Exploiting Bistability for High Force Density Reflexive Gripping", 2019 International Conference on Robotics and Automation (ICRA), May 2019 (7 pages).

Wikipedia, "Slap bracelet", retrieved from the Internet: <https://en.wikipedia.org/wiki/Slap_bracelet>, [retrieved Mar. 12, 2021] (2 pages).

Maffiodo et al. "Three-Fingered Gripper with Flexure Hinges Actuated by Shape Memory Alloy Wires", Int. J. of AutomationTechnology, vol. 11, No. 3, pp. 355-360, 2017 (6 pages).

Buckner et al. "Roboticizing fabric by integrating functional fibers", Proceedings of the National Academy of Sciences, Oct. 2020 (10 pages).

Blain, "Refrigerants not required: Flexible metal cooling prototype demonstrates extreme efficiency", retrieved from the Internet: <https://newatlas.com/shape-memory-alloy-nitinol-heating-cooling/58837/> [retrieved Apr. 1, 2024], dated Mar. 13, 2019 (13 pages).

Taniguchi, "Flexible Artificial Muscle Actuator Using Coiled Shape Memory Alloy Wires", APCBEE Procedia 7, pp. 54-59, May 2013 (6 pages).

Acome et al., "Hydraulically amplified self-healing electrostatic actuators with muscle-like performance", Science 359, pp. 61-65, 2018 (5 pages).

Wang et al., "Recent Progress in Artificial Muscles for Interactive Soft Robotics", Advanced Materials, vol. 33, Issue 19, published Oct. 27, 2020 (48 pages).

Liang et al., "Comparative study of robotic artificial actuators and biological muscle", Advances in Mechanical Engineering, 2020 (25 pages).

El-Atab et al., "Soft Actuators for Soft Robotic Applications: A Review", Advanced Intelligent Systems 2020 (37 pages).

Pagoli et al., "Review of soft fluidic actuators: classification and materials modeling analysis", Smart Materials and Structures, vol. 31, 2021 (31 pages).

Park et al., "A Novel Fabric Muscle Based on Shape Memory Alloy Springs", Soft Robotics, vol. 7, No. 3, 2020 (11 pages).

Ebay, "Cardboard Dividers 5 Sets 7.5" X 10.5" X 4" High 12 cell", retrieved from the Internet: <https://www.ebay.comitm/175101454003var=0&mkevt=1&mkcid=1&mkrid=711-53200-19255-

(56) References Cited

OTHER PUBLICATIONS

0&campid=5337076261&toolid=10049&customid=AC-F63RFK9J675c23041e8b13f9c32042ed51988cf3> [retrieved Jan. 20, 2022](1 page).
Cazottes et al., "Bistable Buckled Beam: Modeling of Actuating Force and Experimental Validations", Journal of Mechanical Design, 2009 (10 pages).
Cazottes et al., "Design of Actuation for Bistable Structures Using Smart Materials," Advances in Science and Technology, vol. 54, pp. 287-292, 2008 (1st Page/Abstract only).
Cazottes et al, "Actuation of bistable buckled beams with Macro-Fiber Composites," IEEE/RSJ International Conference on Intelligent Robots and Systems, pp. 564-569, 2008 (7 pages).
Haines et al., "New Twist on Artificial Muscles," Proceedings of the National Academy of Sciences, vol. 113, No. 42, pp. 11709-11716, Oct. 18, 2016 (9 pages).
Inoue et al., "High-performance structure of a coil-shaped soft-actuator consisting of polymer threads and carbon nanotube yarns," AIP Advances 8, 2018, (8 pages).
Abbas et al., "A Physics Based Model for Twisted and Coiled Actuator" 2017 IEEE International Conference on Robotics and Automation (ICRA), pp. 6121-6126, 2017 (6 pages).
Haines et al., "Artificial Muscles from Fishing Line and Sewing Thread" (Supplementary Materials) Science 343, 868, 2014 (36 pages).
Yip et al., "On the Control and Properties of Supercoiled Polymer Artificial Muscles," IEEE Transactions on Robotics 2017 (11 pages).
alibaba.com, "Hangzhou Phase Change Technology Co., Ltd", Retrieved from the Internet: <https://hzfeijie.en.alibaba.com/product/1448845650-220286736/phase_change_material_PCM_balls.html#!>, [Retrieved May 2, 2017] (3 pages).
Goodfellow Corporation, "New to Our Range: A Magnetic Shape Memory Alloy that Converts Magnetic Field Energy into Kinetic Energy," <retrieved from the Internet: http://www.goodfellowusa.com/corporate/news/US/June-2011/us.htm> [retrieved Jan. 23, 2012] (2 pages).
Goodfellow Corporation, "Magnetic Shape Memory Material", <retrieved from the Internet: http://www.goodfellowusa.com/larger-quantities/alloys/magnetic-shape-memory-material/> [retrieved Jan. 23, 2012] (3 pages).
Sherrit et al., "Planar Rotary Motor using Ultrasonic Horns", Proc. SPIE 7981, Sensors and Smart Structures Technologies for Civil, Mechanical, and Aerospace Systems 2011, 79810O, Apr. 13, 2011 (8 pages).
Henry, "Dynamic Actuation Properties of Ni—Mn—Ga Ferromagnetic Shape Memory Alloys", submitted to the Massachusetts Institute of Technology Department of Materials Science and Engineering on May 22, 2002, images on pp. 64-66 (202 pages).
Zhu et al., U.S. Appl. No. 18/433,896, filed Feb. 6, 2024.
Zhu et al., U.S. Appl. No. 18/399,075, filed Dec. 28, 2023.
Rowe et al., U.S. Appl. No. 18/178,302, filed Mar. 3, 2023.
Rowe et al., U.S. Appl. No. 18/399,026, filed Dec. 28, 2023.
Rowe et al., U.S. Appl. No. 18/453,395, filed Aug. 22, 2023.
Zhu et al., U.S. Appl. No. 18/172,637, filed Feb. 22, 2023.
Pinkelman et al., U.S. Appl. No. 18/452,343, filed Aug. 18, 2023.
Pinkelman et al., U.S. Appl. No. 18/452,376, filed Aug. 18, 2023.
Rowe et al., U.S. Appl. No. 18/452,734, filed Aug. 21, 2023.
Correa et al., "Mechanical Design of Negative Stiffness Honeycomb Materials", Integrating Materials and Manufacturing Innovation, 4:10, pp. 1-11, 2015 (11 pages).
Ferguson-Pell, "Seat Cushion Selection", J. Rehab. Res. Dev., Special Supplement #2, 23(3), pp. 49-73, 1986 (25 pages).
Endragon Technology Corporation, "What is Electrostatic Chuck?" retrieved from the Internet: <https://edragoncorp.weebly.com/what-is-electrostatic-chuck.html>, 2014 (8 pages).
Strittmatter et al., "Intelligent materials in modern production—Current trends for thermal shape memory alloys," Procedia Manufacturing, vol. 30, pp. 347-356, 2019 (10 pages).
Shunk, "GM awarded DOE money to research Shape Memory Alloy heat engines," dated Nov. 2, 2009, retrieved from the Internet: <https://www.autoblog.com/2009/11/02/gm-awarded-doe-money-to-research-shape-memory-alloy-heat-engines/>, [retrieved Mar. 26, 2021] (2 pages).
Gummin, "Shape Memory Alloy Massage for Seating Surfaces," dated Jun. 15, 2018, retrieved from the Internet: <https://contest.techbriefs.com/2018/entries/consumer-products/8871> (3 pages).
Stoeckel, "Shape Memory Actuators for Automotive Applications," Materials & Design. vol. 11, No. 6, pp. 302-307, Dec. 1990 (6 pages).
Katayama et al., "Shape Memory Alloy Wire Actuated Hinge Mechanism for Deploying Segmented Plates," Bulletin of Osaka Prefecture University, Series A, vol. 45, No. 2, 1996, pp. 119-124 (8 pages).
Rowe et al., U.S. Appl. No. 63/485,398, filed Feb. 16, 2023.
Rowe et al., U.S. Appl. No. 18/329,217, filed Jun. 5, 2023.
Spiess, "#321 7 Sensors tested: Measuring Current with Microcontrollers (Arduino, ESP32, ESP8266)", uploaded on Apr. 5, 2020 by user "Andreas Spiess" accessible via the Internet: <https://www.youtube.com/watch?v=cG8moaufmQs> [screenshots captured Nov. 21, 2024] (15 pages).

\* cited by examiner

1000

Analyze Visual Content to Determine Corresponding Chair Movement
1010

Select Actuator(s) to Achieve Corresponding Chair Movement
1020

Cause Selected Actuator(s) to be Activated
1030

FIG. 10

CHAIR WITH SHAPE MEMORY MATERIAL-BASED MOVEMENT SYNCHRONIZED WITH VISUAL CONTENT

FIELD

The subject matter herein relates in general to chairs and, more particularly, to chairs with adjustable portions.

BACKGROUND

A chair is a common piece of furniture. It has a seat and a back attached to the seat. Chairs can be used for various purposes and can have various designs. Chairs can be configured to provide support and comfort to a person. Some chairs can include ergonomic features to enhance user comfort. Some chairs are powered and allow a user to adjust one or more aspects of the seat.

SUMMARY

In one respect, the present disclosure is directed to a chair. The chair includes a seat portion and a plurality of actuators. The actuators are located below the seat portion. Each of the actuators can include one or more shape memory material members. Each of the actuators can be configured such that, when an activation input is provided to the one or more shape memory material members, the one or more shape memory material members change from a first configuration to a second configuration and cause the actuator to morph into an activated configuration a height of the actuator increases. The actuators can be operatively positioned to cause a movement of the seat portion.

In another respect, the present disclosure is directed to a system. The system includes a chair with a seat portion. The system includes a plurality of actuators. The actuators can be located below the seat portion. Each of the actuators can include one or more shape memory material members. Each of the actuators can be configured such that, when an activation input is provided to the one or more shape memory material members, the one or more shape memory material members change from a first configuration to a second configuration and cause the actuator to morph into an activated configuration. The actuators can be selectively actuatable. The actuators can be operatively positioned to cause a movement of the seat portion. The system can include one or more processors. The one or more processors can be operatively connected to selectively activate one or more of the plurality of actuators by causing the activation input to be provided to the one or more shape memory material members of at least one of the plurality of actuators.

In still another respect, the present disclosure is directed to a method of moving a portion of a chair synchronized with visual content. The chair can include a seat portion and a plurality of actuators located below the seat portion. Each of the actuators can include one or more shape memory material members. Each of the actuators can be configured such that, when an activation input is provided to the one or more shape memory material members, the one or more shape memory material members change from a first configuration to a second configuration and cause the actuator to morph into an activated configuration. The actuators can be selectively actuatable and operatively positioned to cause a movement of the seat portion. One or more processors can be operatively connected to selectively activate one or more of the actuators by causing the activation input to be provided to the one or more shape memory material members of at least one of the actuators. The method can include analyzing visual content to determine a corresponding chair movement. The corresponding chair movement can be synchronized with at least a portion of the visual content. The method can include selecting one or more of the actuators to achieve the corresponding chair movement. The method can include causing an activation input to be provided to the selected one or more of the actuators. Thus, the selected one or more actuators can be activated to cause the seat to move according to the corresponding chair movement.

BRIEF DESCRIPTION OF THE DRAWINGS

FIG. 10 is an example of a method.

DETAILED DESCRIPTION

Figure 1:
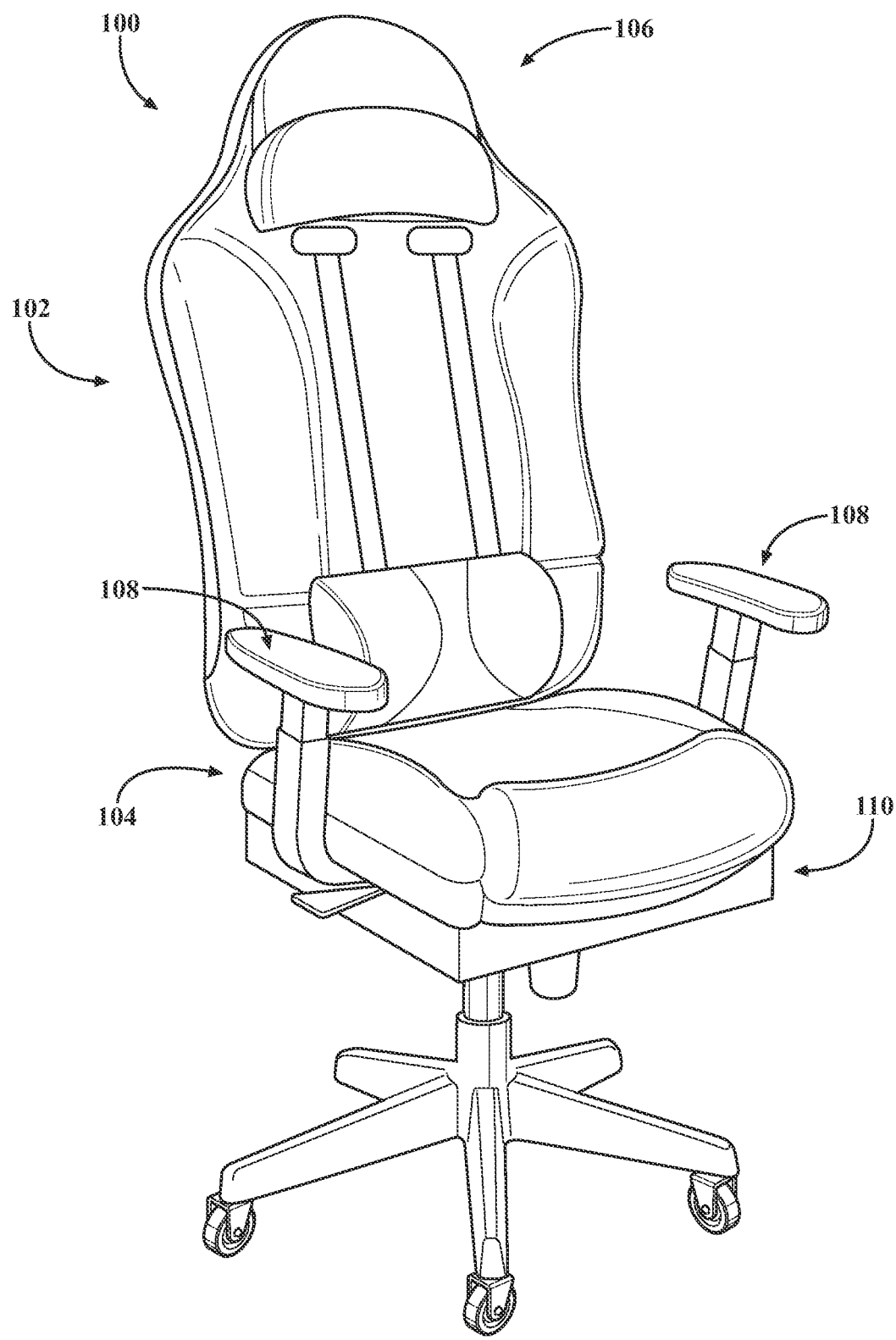
FIG. 1 is an example of a chair.

Arrangements described here are directed to the use of shape memory material-based actuators in connection with a chair used for viewing visual content, such as a gaming chair, a movie chair, a theater chair, or any other similar seat structure, now known or later developed. The chair can be configured for synchronized movement with visual content presented to an occupant of the chair. The chair can include a plurality of actuators operatively positioned with respect to the seat portion of the chair. The actuators can include one or more shape memory material members. Selected actuators can be activated to cause the seat portion to move in a synchronized manner with the visual content.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-11, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a chair 100 is shown. The chair 100 can be any type of seat, now known or later developed. The chair 100 can have any suitable configuration. For instance, the chair 100 can include a back portion 102 and a seat portion 104. In some arrangements, the chair 100 can include a headrest 106 and/or arm rests 108. In some arrangements, the chair 100 can be an office chair, a gaming chair, a movie theater chair, a recliner, or any other type of seat or chair, now known or later developed.

The chair 100 can include a base portion 110 located below the seat portion 104. The seat portion 104 can include a cushion. The base portion 110 can include an upper platform 112 and a lower platform 114. In a non-activated condition, the upper platform 112 and the lower platform 114 can be substantially parallel to each other.

In some arrangements, the base portion 110 can include one or more side walls 116. The side wall(s) 116 can be operatively connected to the lower platform 114. In some arrangements, the side wall(s) 116 can be a rigid structure. In such case, the side wall(s) 116 may not be attached to the upper platform 112. When one or more of the actuators 200 are activated, a portion of the upper platform 112 may separate from the side wall(s) 116. In some arrangements, the side wall(s) 116 can be configured to expand and contract, such as in an accordion-like configuration. In such case, the side wall(s) 116 can be operatively connected to the upper platform 112. Thus, when one or more of the actuators 200 are activated, the upper platform 112 can remain connected to the side wall(s) 116.

Figure 2:
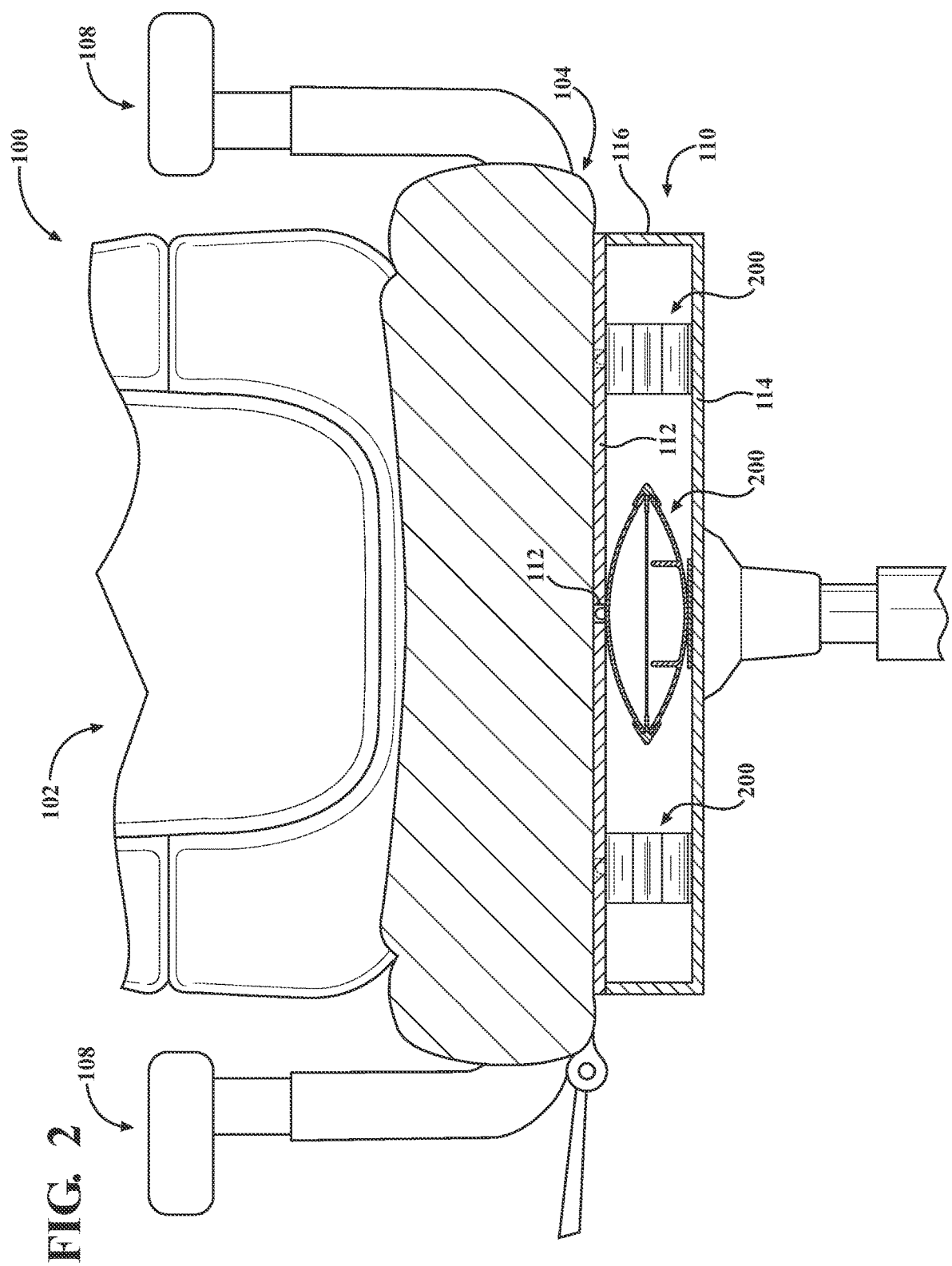
FIG. 2 is a view of the chair with a cut-away portion, showing a plurality of actuators.

FIG. 2 is a view of the chair 100 with a cut-away of the base portion 110. A plurality of actuators 200 can be located within the base portion 110. The plurality of actuators 200 can be operatively positioned between the upper platform 112 and the lower platform 114. When not activated, the upper platform 112 and the lower platform 114 can be substantially parallel to each other. It will be understood that the terms "upper" and "lower" are used for convenience to note the relative position of structures when used in its intended operational position and that these terms are not intended to be limiting. The actuators 200 can be operatively connected to one or both of the upper platform 112 and the lower platform 114.

The lower platform 114 can be substantially fixed. As a result, the activation and deactivation of the actuators 200 does not essentially affect the orientation or position of the lower platform 114.

On the other hand, the upper platform 112 can be configured to be movable in response to activation or deactivation of the actuators 200. As a result, the actuators 200 can cause a movement of the seat portion 104 or the rest of the chair 100 located above the upper platform 112. The seat portion 104 can be supported on the upper platform 112.

Figure 3:
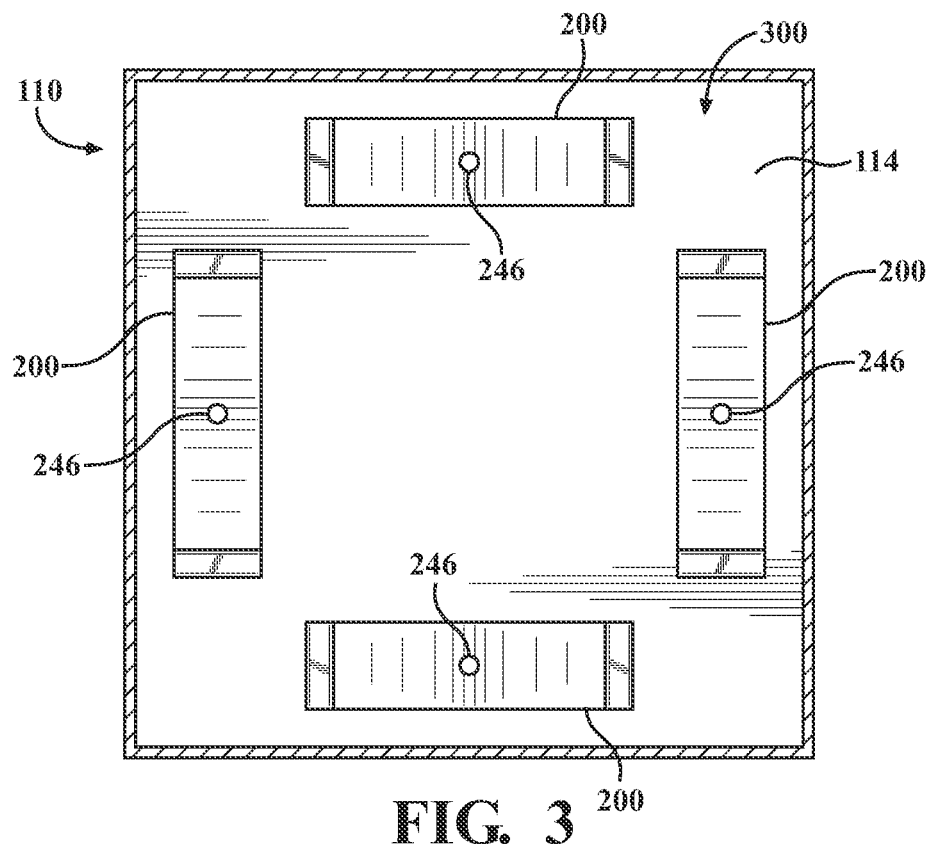
FIG. 3 is an example of a first arrangement of the plurality of actuators.
Figure 4:
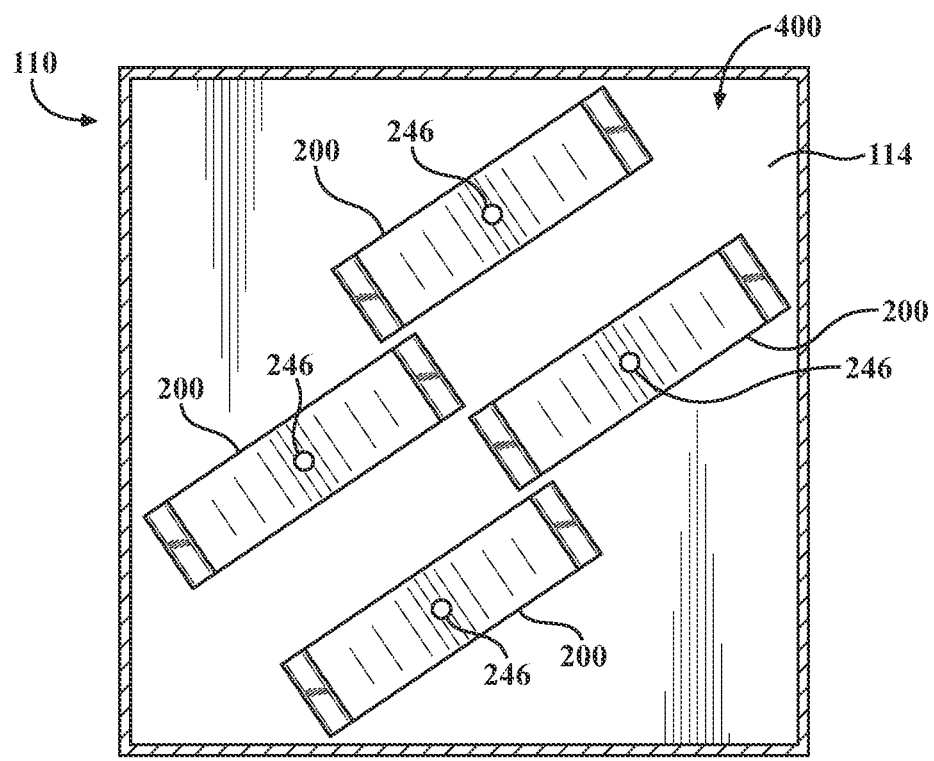
FIG. 4 is an example of a second arrangement of the plurality of actuators.
Figure 5:
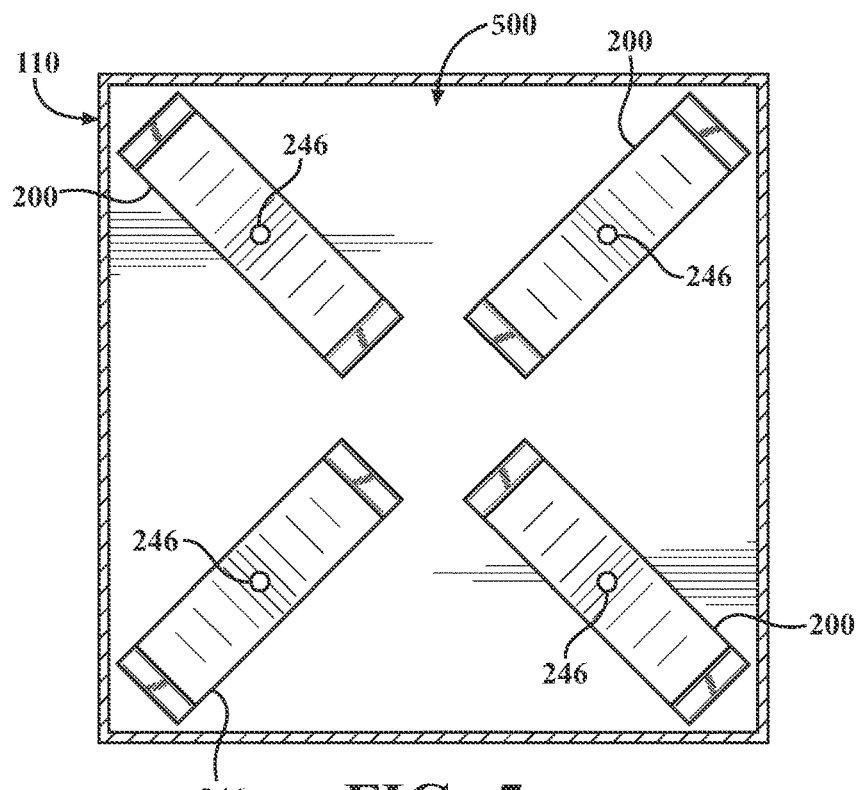
FIG. 5 is an example of a third arrangement of the plurality of actuators.

The plurality of actuators 200 can be arranged in any of a number of ways. Some example arrangements are shown in FIGS. 3-5. Referring to FIG. 3, an example of a first arrangement 300 of the plurality of actuators 200 is shown. In this example, the actuators 200 can be arranged in a substantially rectangular pattern. Each actuator 200 can be oriented at substantially 90 degrees relative to its neighboring actuator 200.

Referring to FIG. 4, an example of a second arrangement 400 of the plurality of actuators 200 is shown. In this example, the plurality of actuators 200 can be arranged in an offsetting substantially parallel pattern. As is shown, there can be two groups of actuators 200. In each group, the actuators 200 can be offset from each other. Also, the actuators 200 can be substantially parallel to each other.

FIG. 5 is an example of a third arrangement 500 of the plurality of actuators 200. In this example, the actuators 200 can be arranged in a radial pattern about a central point or area. The actuators 200 can be substantially equally spaced, or one or more of the actuators 200 can be non-equally spaced from the other actuators 200.

While the above examples show various arrangements in which there are four actuators, it will be appreciated that arrangements described herein are not limited to there being four actuators. Indeed, there can be more than four actuators, or there can be fewer than four actuators.

Figure 7:
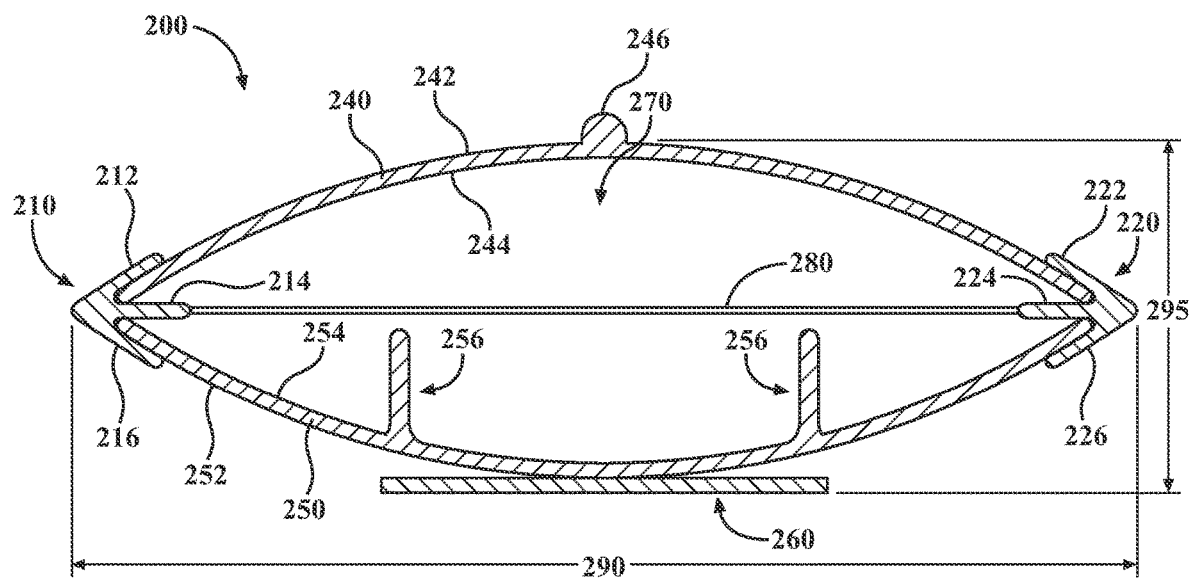
FIG. 7 is an example of an actuator in a non-activated condition.
Figure 8:
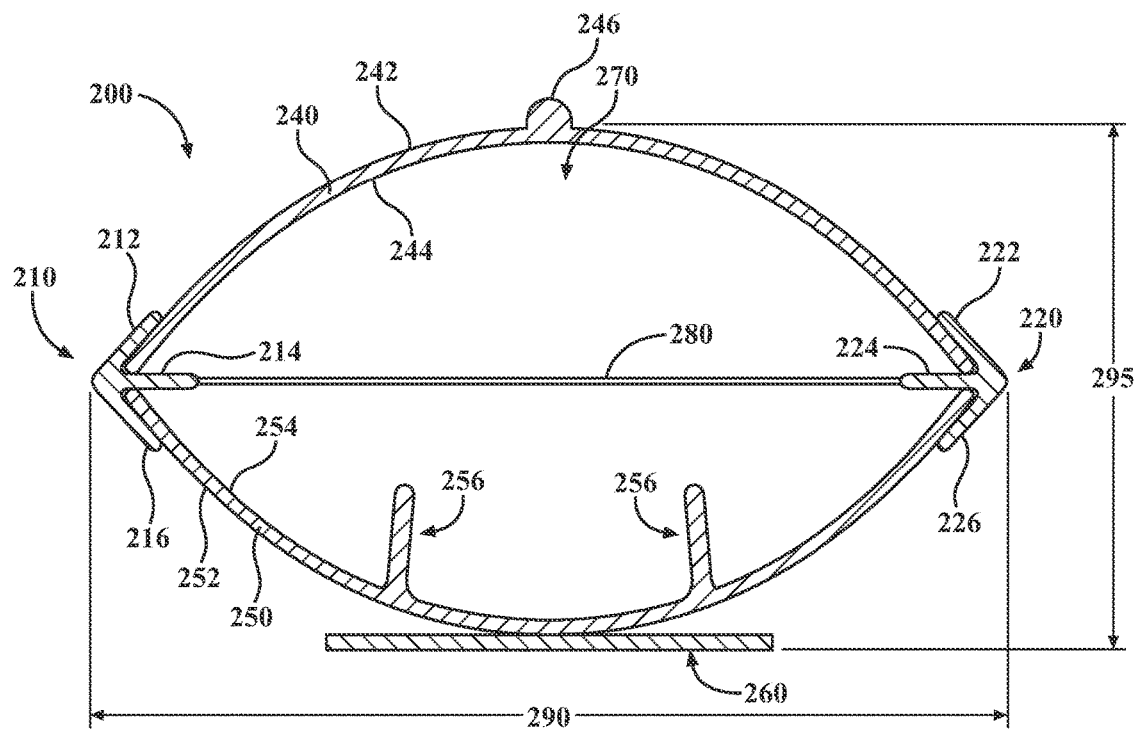
FIG. 8 is an example of the actuator in an activated condition.

FIGS. 7-8 show an example of an actuator 200. FIG. 7 shows an example of the actuator 200 in a non-activated condition, and FIG. 8 shows an example of the actuator 200 in an activated condition.

The actuator 200 can include a first endcap 210 and a second endcap 220. The first endcap 210 and the second endcap 220 can be spaced apart. The first endcap 210 and the second endcap 220 can face toward each other.

The first endcap 210 and the second endcap 220 can have any suitable size, shape, and/or configuration. In one or more arrangements, the first endcap 210 and the second endcap 220 can be substantially mirror images of each other. In one or more arrangements, the first endcap 210 can have three prongs, including an upper prong 212, a middle prong 214, and a lower prong 216. Similarly, the second endcap 220 can have three prongs, including an upper prong 222, a middle prong 224, and a lower prong 226.

The first endcap 210 and the second endcap 220 can be made of any suitable material. The first endcap 210 and the second endcap 220 can be substantially rigid structures. In some arrangements, the upper prongs 212, 222 and the lower prongs 216, 226 of the first and second endcaps 210, 220 can be flexible to accommodate changes to the actuator 200 when activated and deactivated. The first and second endcaps 210, 220 can be oriented such that the middle prong 214 of the first endcap 210 is substantially aligned with the middle prong 224 of the second endcap 220.

The actuator 200 can include a first outer member 240. The first outer member 240 can have a bowed shape. The first outer member 240 can have a convex side 242 and a concave side 244. In some arrangements, the first outer member 240 can be made of a single piece of material. In other arrangements, the first outer member 240 can be made of a plurality of pieces of material. In some arrangements, the first outer member 240 can be made of a plurality of layers. The first endcap 210 and the second endcap 220 can be made of any suitable material. In some arrangements, the first outer member 240 can be made of a flexible to accommodate changes to the actuator 200 when activated and deactivated.

The first outer member 240 can include one or more protrusions 246. The protrusion(s) 246 can be used to properly locate another structure on the plurality of actuators 200. In some arrangements, the protrusion(s) 246 can be substantially centrally located on the convex side 242 of the first outer member 240. In some arrangements, the protrusion(s) 246 can be formed separately and operatively connected to the convex side 242 of the first outer member 240. Any suitable manner of operative connection can be provided, such as one or more fasteners, one or more adhesives, one or more welds, one or more brazes, one or more forms of mechanical engagement, or any combination thereof. In other arrangements, the protrusion(s) 246 and the first outer member 240 can be formed together as a unitary structure.

The first outer member 240 can be operatively connected to the first endcap 210 and the second endcap 220. For instance, the first outer member 240 can be operatively connected to the upper prong 212 of the first endcap 210 and to the upper prong 222 of the second endcap 220. Any suitable manner of operative connection can be provided, such as one or more fasteners, one or more adhesives, one or more welds, one or more brazes, one or more forms of mechanical engagement, or any combination thereof. In some arrangements, one or more portions of the first outer member 240, such as the ends, can be operatively connected to the middle prong 214 of the first endcap 210 and the middle prong 224 of the second endcap 220.

The actuator 200 can include a second outer member 250. The second outer member 250 can have a bowed shape. The second outer member 250 can have a convex side 252 and a concave side 254. In some arrangements, the second outer member 250 can be made of a single piece of material. In other arrangements, the second outer member 250 can be made of a plurality of pieces of material. In some arrangements, the second outer member 250 can be made of a plurality of layers. The first endcap 210 and the second endcap 220 can be made of any suitable material. In some arrangements, the second outer member 250 can be made of a flexible to accommodate changes to the actuator 200 when activated and deactivated.

The actuator 200 can include a base 260. The base 260 can provide stability to the actuator 200. In some arrangements, the base 260 can be operatively connected to the convex side 252 of the second outer member 250. Any suitable manner of operative connection can be provided, such as one or more fasteners, one or more adhesives, one or more welds, one or more brazes, one or more forms of mechanical engagement, or any combination thereof. In other arrangements, the base 260 and the second outer member 250 can be formed together as a unitary structure. The base 260 can have any suitable size, shape, and/or configuration. The base 260 can be a substantially flat structure. In one or more arrangements, the base 260 can be substantially rectangular. The base 260 can be made of any suitable material. The base 260 can be made of the same material as the second outer member 250, or the base 260 can be made of a different material.

The actuator 200 can include one or more ribs 256. The rib(s) 256 can prevent the first outer member 240 from bottoming out. In some arrangements, the rib(s) 256 can be operatively connected to the concave side 254 of the second outer member 250. Any suitable manner of operative connection can be provided, such as one or more fasteners, one or more adhesives, one or more welds, one or more brazes, one or more forms of mechanical engagement, or any combination thereof. In other arrangements, the rib(s) 256 and the second outer member 250 can be formed together as a unitary structure. The rib(s) 256 can have any suitable size, shape, and/or configuration. In one or more arrangements, the rib(s) 256 can be substantially rectangular. The rib(s) 256 can be made of any suitable material. The rib(s) 256 can be made of the same material as the second outer member 250, or the rib(s) 256 can be made of a different material.

The second outer member 250 can be operatively connected to the first endcap 210 and the second endcap 220. For instance, the second outer member 250 can be operatively connected to the lower prong 216 of the first endcap 210 and to the lower prong 226 of the second endcap 220. Any suitable manner of operative connection can be provided, such as one or more fasteners, one or more adhesives, one or more welds, one or more brazes, one or more forms of mechanical engagement, or any combination thereof. In some arrangements, one or more portions of the second outer member 250, such as the ends, can be operatively connected to the middle prong 214 of the first endcap 210 and the middle prong 224 of the second endcap 220.

The first outer member 240 and the second outer member 250 can be composed of or include a substantially flexible material. The first outer member 240 and the second outer member 250 can be reversibly deformed, such that the first outer member 240 and the second outer member 250 will not be damaged during the deformation. Damage can include cracking, breaking, fracturing, or other forms of inelastic deformation. In some implementations, the flexible material is a flexible polymer. Specific examples of flexible polymers which can be used various implementations include rubber (including natural rubber, styrene-butadiene, polybutadiene, neoprene, ethylene-propylene, butyl, nitrile, silicone), polycarbonates, acrylic, polyesters, polyethylenes, polypropylenes, nylon, polyvinyl chlorides, polystyrenes, elastomers, polyolefins, and others flexible polymers known to persons skilled in the art. In some implementations, the flexible material can be exposed to a degree of stretch selected in the range of about 1% to about 1300%, such as about 10% to about 1300%, or about 100% to about 1300% without resulting in mechanical failure (e.g., tearing, cracking, or inelastic deformation). In further implementations, the flexible material can be deformed to a radius of curvature selected in the range of 100 micrometers ($\mu$m) to 3 meters (m) without mechanical failure.

The first outer member 240 and the second outer member 250 can be oriented such that their concave sides 244, 254 face each other. The first outer member 240 and the second outer member 250 can define a cavity 270.

The actuator 200 can include one or more shape memory material members 280. The shape memory material members 280 can be operatively connected to the first endcap 210 and the second endcap 220. More particularly, the shape memory material member 280 can be operatively connected to the middle prong 214 of the first endcap 210 and the middle prong 224 of the second endcap 220. Any suitable manner of operative connection can be provided, such as one or more fasteners, one or more adhesives, one or more welds, one or more brazes, one or more forms of mechanical engagement, or any combination thereof. The shape memory material member(s) 280 can be located within the cavity 270.

In some arrangements, there can be a single shape memory material member 280. In such case, the shape memory material member 280 can, for example, extend straight across the cavity from the first endcap 210 and the second endcap 220. In another example, the shape memory material member 280 can extend in a zig zag or serpentine pattern between the first endcap 210 and the second endcap 220.

In some arrangements, there can be a plurality of shape memory material members 280. In such case, the shape memory material members 280 can be distributed, arranged, and/or oriented in any suitable manner. For instance, the shape memory material members 280 can extend substantially parallel to each other. In other arrangements, one or more of the shape memory material members 280 can extend non-parallel to the other shape memory material members 280. In some instances, some of the plurality of shape memory material members 280 may cross over each other.

The phrase "shape memory material" includes materials that changes shape when an activation input is provided to the shape memory material and, when the activation input is discontinued, the material substantially returns to its original shape. Examples of shape memory materials include shape memory alloys (SMA) and shape memory polymers (SMP).

In one or more arrangements, the shape memory material members 280 can be shape memory material wires. As an example, the shape memory material members 280 can be shape memory alloy wires. Thus, when an activation input (i.e., heat) is provided to the shape memory alloy wire(s), the wire(s) can contract. Shape memory alloy wire(s) can be heated in any suitable manner, now known or later developed. For instance, shape memory alloy wire(s) can be heated by the Joule effect by passing electrical current through the wires. In some instances, arrangements can provide for cooling of the shape memory alloy wire(s), if desired, to facilitate the return of the wire(s) to a non-activated configuration.

The wire(s) can have any suitable characteristics. For instance, the wire(s) can be high temperature wires with austenite finish temperatures from about 80 degrees Celsius to about 110 degrees Celsius. The wire(s) can have any suitable diameter. For instance, the wire(s) can be from about 0.2 millimeters (mm) to about 0.7 mm, from about 0.3 mm to about 0.5 mm, or from about 0.375 millimeters to about 0.5 millimeters in diameter. In some arrangements, the wire(s) can have a stiffness of up to about 70 gigapascals. The pulling force of SMA wire(s) can be from about 250 MPA to about 400 MPa. The wire(s) can be configured to provide an initial moment from about 300 to about 600 N·mm, or greater than about 500 N·mm, where the unit of newton millimeter (N·mm) is a unit of torque (also called moment) in the SI system. One newton meter is equal to the torque resulting from a force of one newton applied perpendicularly to the end of a moment arm that is one meter long. In various aspects, the wire(s) can be configured to transform in phase, causing the shape memory material members 280 to be moved from non-activated position to an activated position in about 3 seconds or less, about 2 seconds or less, about 1 second or less, or about 0.5 second or less.

The wire(s) can be made of any suitable shape memory material, now known or later developed. Different materials can be used to achieve various balances, characteristics, properties, and/or qualities. As an example, an SMA wire can include nickel-titanium (Ni—Ti, or nitinol). One example of a nickel-titanium shape memory alloy is FLEXINOL, which is available from Dynaolloy, Inc., Irvine, California. As a further example, the SMA wires can be made of Cu—Al—Ni, Fe—Mn—Si, or Cu—Zn—Al.

The SMA wire can be configured to increase or decrease in length upon changing phase, for example, by being heated to a phase transition temperature $T_{SMA}$. Utilization of the intrinsic property of SMA wires can be accomplished by using heat, for example, via the passing of an electric current through the SMA wire in order provide heat generated by electrical resistance, in order to change a phase or crystal structure transformation (i.e., twinned martensite, detwinned martensite, and austenite) resulting in a lengthening or shortening the SMA wire. In some implementations, during the phase change, the SMA wire can experience a decrease in length of from about 2 to about 8 percent, or from about 3 percent to about 6 percent, and in certain aspects, about 3.5 percent, when heated from a temperature less than the $T_{SMA}$ to a temperature greater than the $T_{SMA}$.

Other active materials may be used in connection with the arrangements described herein. For example, other shape memory materials may be employed. Shape memory materials, a class of active materials, also sometimes referred to as smart materials, include materials or compositions that have the ability to remember their original shape, which can subsequently be recalled by applying an external stimulus, such as an activation signal.

While the shape memory material members 280 are described, in some implementations, as being wires, it will be understood that the shape memory material members 280 are not limited to being wires. Indeed, it is envisioned that suitable shape memory materials may be employed in a variety of other forms, such as sheets, plates, panels, strips, cables, tubes, or combinations thereof. In some arrangements, the shape memory material members 280 may include an insulating coating.

The actuator 200 can include a first dimension 290 and the second dimension 295. The first dimension 290 can describe a width of the actuator 200, and the second dimension 295 can describe a height of the actuator 200. The first dimension 290 and the second dimension 295 can be substantially perpendicular to each other.

As noted above, FIG. 8 is an example of the actuator 200 in an activated condition. When an activation input (e.g., electrical energy) is provided to the shape memory material member(s) 280, the shape memory material member(s) 280 can contract. This contraction causes the shape memory material member(s) 280 to pull the first endcap 210 and the second endcap 220 toward each other in a direction that corresponds to the first dimension 290.

Consequently, the ends of the first outer member 240 can be drawn toward each other in a direction that corresponds to the first dimension 290, and the ends of the second outer member 250 can be drawn toward each other in a direction that corresponds to the first dimension 290. As a result, the first outer member 240 and the second outer member 250 can bow outward and away from each other in a direction that corresponds to the second dimension 295. It will be appreciated that the first dimension 290 (i.e., the width) of the actuator 200 can decrease, and the second dimension 295 (i.e., the height) of the actuator 200 can increase.

It will be appreciated that the actuator 200 shown in FIGS. 7-8 is merely one example of an actuator that can be used in connection with arrangements described herein. Other actuator configurations are possible. Additional non-limiting examples of actuators with shape memory material members are described in U.S. Pat. Nos. 10,960,793; 11,285,844; and U.S. Patent Application Publ. No. 2020/0298732, which are incorporated herein by reference in their entirety.

Figure 6:
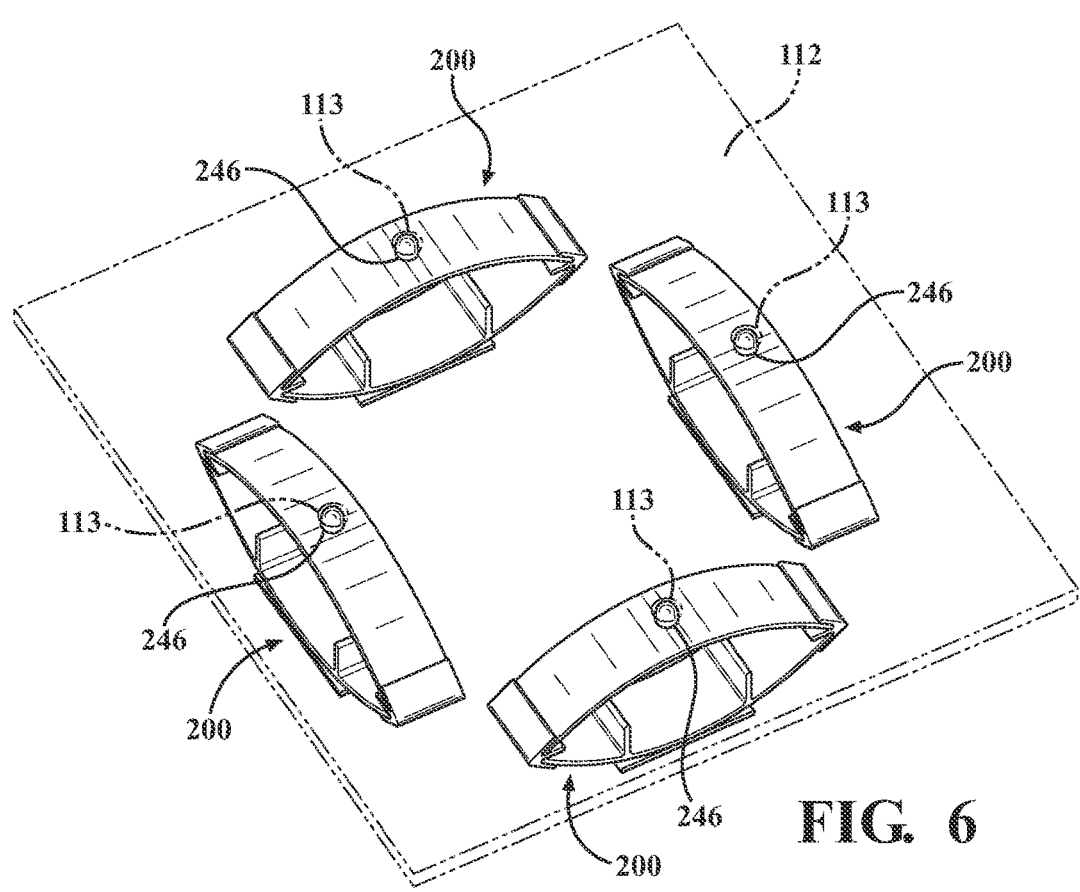
FIG. 6 is a view of a portion of the chair, showing a platform on top of the plurality of actuators.

FIG. 6 is a view of a portion of the chair 100, showing the upper platform 112 on top of the plurality of actuators 200. As noted above, the upper platform 112 can be supported by the actuators 200. In some arrangements, the upper platform 112 can be a plate-like structure. The upper platform 112 can be made of any suitable material, including, for example, metals, alloys, plastics, polymers, acrylic, or wood, just to name a few possibilities. The upper platform 112 can have any suitable size, shape, and/or configuration. In one or more arrangements, the upper platform 112 can be substantially rectangular.

The upper platform 112 can be operatively connected to the plurality of actuators 200. Any suitable form of operative connection can be provided. For instance, the upper platform 112 can include a plurality of apertures 113. Each of the apertures 113 can receive a respective one of the protrusions 246 on the actuators 200. In this way, the upper platform 112 can be properly located on the actuators 200. It will be appreciated that, when the actuators 200 are not activated, the upper platform 112 can be substantially horizontal. When the actuators 200 are activated, the upper platform 112 can become non-horizontal. When the actuators 200 are activated, the protrusions 246 can remain within the apertures 113 in the upper platform 112.

Alternatively or additionally, other forms of operative connection between the upper platform 112 and the actuators 200 can be provided. For instance, the upper platform 112 can be operatively connected to the actuators 200 by one or more fasteners, one or more adhesives, one or more forms of mechanical engagement, or any combination thereof.

Figure 11:
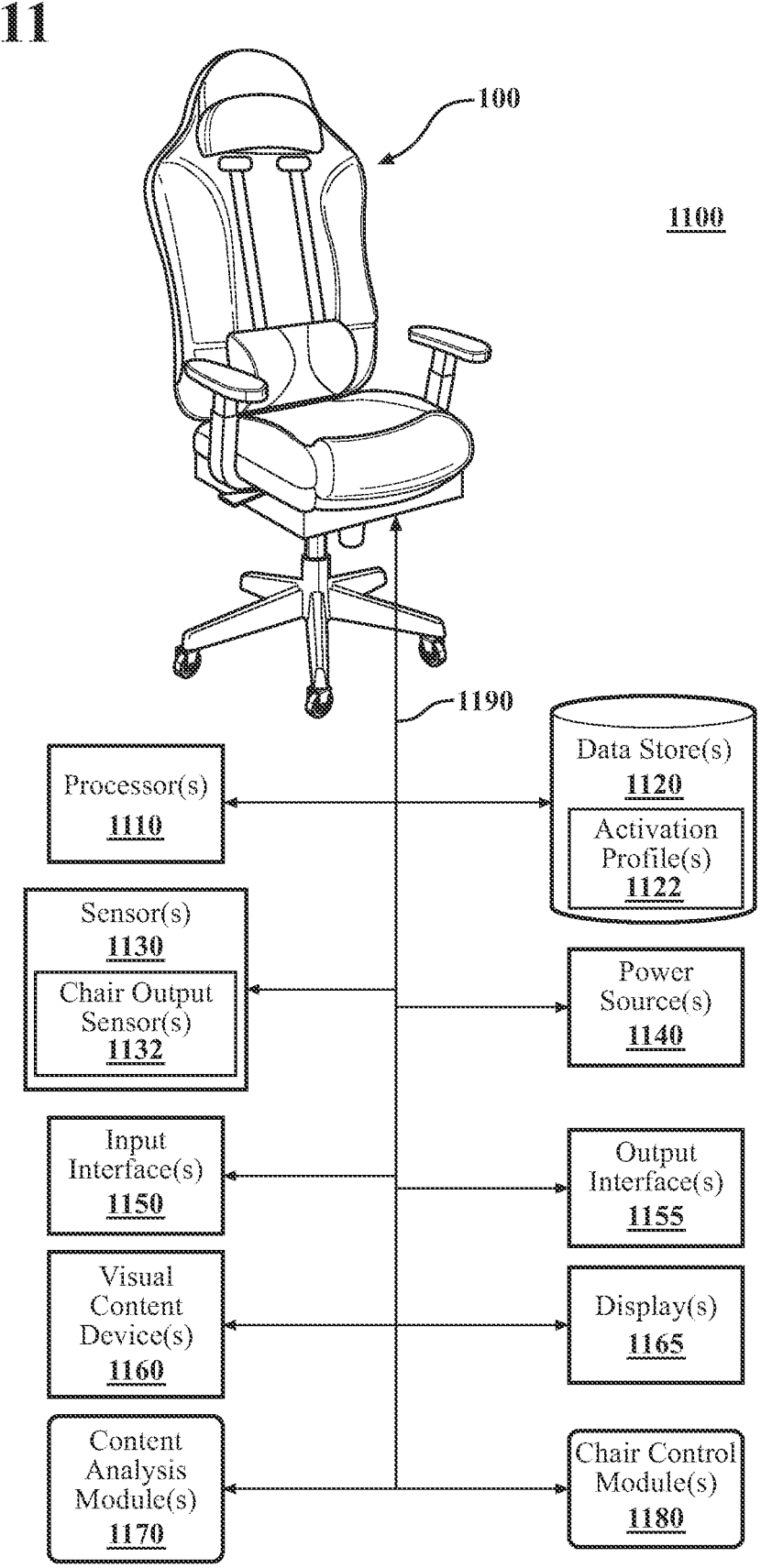
FIG. 11 is an example of a system.

FIG. 11 shows an example of a system 1100. The system 1100 can include various elements. Some of the possible elements of the system 1100 are shown in FIG. 11 and will now be described. It will be understood that it is not necessary for the system 1100 to have all of the elements shown in FIG. 11 or described herein. The system 1100 can have any combination of the various elements shown in FIG. 11. Further, the system 1100 can have additional elements to those shown in FIG. 11. In some arrangements, the system 1100 may not include one or more of the elements shown in FIG. 11. Further, while the various elements may be located on or within a chair, it will be understood that one or more of these elements can be located external to the chair. Further, the elements shown may be physically separated by large distances.

The system 1100 can include the chair 100, one or more processors 1110, one or more data stores 1120, one or more sensors 1130, one or more power sources 1140, one or more input interfaces 1150, one or more output interfaces 1155, one or more visual content devices 1160, one or more displays 1165, one or more content analysis modules 1170, and one or more chair control modules 1180. Each of these elements will be described in turn below.

As noted above, the system 1100 can include one or more processors 1110. "Processor" means any component or group of components that are configured to execute any of the processes described herein or any form of instructions to carry out such processes or cause such processes to be performed. The processor(s) 1110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 1110 can include at least one hardware circuit (e.g., an integrated circuit) configured to carry out instructions contained in program code. In arrangements in which there is a plurality of processors 1110, such processors can work independently from each other, or one or more processors can work in combination with each other.

The system 1100 can include one or more data stores 1120 for storing one or more types of data. The data store(s) 1120 can include volatile and/or non-volatile memory. Examples of suitable data stores 1120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 1120 can be a component of the processor(s) 1110, or the data store(s) 1120 can be operatively connected to the processor(s) 1110 for use thereby.

The term "operatively connected," as used throughout this description, can include direct or indirect connections, including connections without direct physical contact.

In some arrangements, the data stores 1120 can include one or more actuation profiles 1122. The actuation profile(s) 1122 can be predefined patterns of activation and deactivation of one or more of the actuators 200 to achieve a desired movement of the chair 100. Examples of the actuation profile(s) 1122 can include tilting forward, tilting backward, tilting right, tilting left, a front-back rocking, a left-right rocking, up, down, vibration, or any combination thereof. The actuation profile(s) 1122 can be for any period of time. In some instances, the actuation profile(s) 1122 can be for a brief moment.

The system 1100 can use the actuation profile(s) 1122 to actuate the actuators 200 without having to determine in real-time which of the actuators 200 would achieve a desired movement of the chair 100. It should be noted that the actuation profile(s) 1122 can take into account one or more characteristics of an occupant of the chair 100. For instance, the activation and deactivation of the actuators 200 can be varied based on one or more characteristics of an occupant of the chair 100, such as a weight of the chair occupant. If the person is heavier than a predefined base weight or weight range, then the activation and deactivation of the actuators 200 can be performed with a greater degree of force. In contrast, if the chair occupant is lighter than a predefined weight level or weight range, then the activation and deactivation of the actuators 200 can be performed with a lesser degree of force.

The system 1100 can include one or more sensors 1130. "Sensor" means any device, component and/or system that can detect, determine, assess, monitor, measure, quantify, acquire, and/or sense something. The one or more sensors 1130 can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the system 1100 includes a plurality of sensors 1130, the sensors can work independently from each other. Alternatively, two or more of the sensors can work in combination with each other. In such case, the two or more sensors can form a sensor network. The sensor(s) 1130 can be operatively connected to the processor(s) 1110, the data store(s) 1120, and/or other elements of the system 1100 (including any of the elements shown in FIG. 1).

The sensor(s) 1130 can include any suitable type of sensor. Various examples of different types of sensors will be described herein. However, it will be understood that the embodiments are not limited to the particular sensors described.

The sensor(s) 1130 can include one or more chair occupant sensors 1132. In some arrangements, the chair occupant sensor(s) 1132 can include weight sensors. The weight sensors can be any suitable sensor, now known or later developed.

In some arrangements, the chair occupant sensor(s) 1132 can include one or more gaze sensors. The gaze sensor(s) can be any suitable sensor, now known or later developed. In one or more arrangements, the gaze sensor(s) can include one or cameras, one or more eye sensors, one or more head sensors, one or more face sensors, one or more eye movement sensors, one or more eye tracking sensors, one or more eye position sensors, one or more eye orientation sensors, one or more head movement sensors, one or more head tracking sensors, one or more head position sensors, one or more head orientation sensors, and/or one or more gaze tracking sensors, just to name a few possibilities. The gaze sensor(s) and/or the processor(s) 1110 can be configured to determine the line of sight of the chair occupant, for example, the direction in which the chair occupant is looking. In some arrangements, the gaze sensor(s) can be integrated into the display(s) 1165 and/or the device in which the display(s) 1165 are integrated. In some arrangements, the gaze sensor(s) can contain optical components that can move (e.g., rotate and/or translate) to discern eye angles, head angles, eye position, head position, and/or eyelid position.

As noted above, the system 1100 can include one or more power sources 1140. The power source(s) 1140 can be any power source capable of and/or configured to energize the shape memory material members 280 of the actuators 200. For example, the power source(s) 1140 can include one or more batteries, one or more fuel cells, one or more generators, one or more alternators, one or more solar cells, and combinations thereof.

The system 1100 can include one or more input interfaces 1150. An "input interface" includes any device, component, system, element or arrangement or groups thereof that enable information/data to be entered into a machine. The input interface(s) 1150 can receive an input from a chair occupant. Any suitable input interface 1150 can be used, including, for example, a keypad, display, touch screen, multi-touch screen, button, joystick, mouse, trackball, microphone and/or combinations thereof.

The system 1100 can include one or more output interfaces 1155. An "output interface" includes any device, component, system, element or arrangement or groups thereof that enable information/data to be presented to a chair occupant. The output interface(s) 1155 can present information/data to a chair occupant. The output interface(s) 1155 can include a display, an earphone, and/or speaker. Some components of the system 1100 may serve as both a component of the input interface(s) 1150 and a component of the output interface(s) 1155.

The system 1100 can include one or more displays 1165. The display(s) 1165 can be any suitable type of display, now known or later developed. The display(s) 1165 can be configured to present visual content thereon. In some arrangements, the display can be a monitor, a television, a laptop, a tablet computer, a smartphone, or other device that includes a display. In some arrangements, the display(s) 1165 can be formed by a projector projecting visual content onto a surface. In some arrangements, the display(s) 1165 can be part of a head mounted display. As an example, the head mounted display can be an extended reality (XR) headset. The XR headset can be any type of XR headset, now known or later developed. Examples of XR headsets include augmented reality (AR), mixed reality (MR), and virtual reality (VR) headsets.

The system 1100 can include one or more visual content devices 1160. The visual content devices 1160 can be any suitable device that can present or cause to be presented visual content. The visual content device(s) 1160 can be any type of visual content device, now known or later developed. In some arrangements, the visual content devices 1160 can be a separate device operatively connected to the display(s) 1165. Non-limiting examples of such visual content devices can include gaming systems, Blu ray players, DVD players, an online or cloud streaming service, or plug and play devices, just to name a few possibilities. In some arrangements, the visual content device(s) 1160 and the display(s) 1165 can be integrated into the same device, such as a laptop.

The visual content presented by the visual content device(s) 1160 can be interactive, such as in a video game. One or more input devices can be operatively connected to the visual content device(s) 1160 to allow a user to interact with the visual content. Examples of the input device(s) can include any types of joystick(s), button(s), keyboard(s), keypad(s), switch(es), pedal(s), foot pedal(s), steering wheel(s), speech recognition, gesture recognition, movement recognition, or eye tracking, now known or later developed. The input device(s) can include any of the input interface(s) 1150 described above. In such case, the visual content device(s) 1160 can be responsive to inputs from the player or content watcher provided by the input devices. In some instances, the visual content presented by the visual content device(s) 1160 can be non-interactive, such as a movie. In such case, the user is not able to provide inputs to affect the movement, point of view, and/or action in the visual content. However, basic visual controls (e.g., on/off, color, brightness, contrast, sharpness, tint, etc.) may be available to the user. In some instances, the visual content device(s) 1160 can be configured to send signals to one or more elements of the system 1100 (e.g., the content analysis module(s) 1170).

The system 1100 can include one or more modules, at least some of which will be described herein. The modules can be implemented as computer readable program code that, when executed by a processor, implement one or more of the various processes described herein. One or more of the modules can be a component of the processor(s) 1110, or one or more of the modules can be executed on and/or distributed among other processing systems to which the processor(s) 1110 is operatively connected. The modules can include instructions (e.g., program logic) executable by one or more processor(s) 1110. Alternatively or in addition, one or more data stores 1120 may contain such instructions.

In one or more arrangements, the modules described herein can include artificial or computational intelligence elements, e.g., neural network, fuzzy logic, or other machine learning algorithms. Further, in one or more arrangements, the modules can be distributed among a plurality of modules. In one or more arrangements, two or more of the modules described herein can be combined into a single module.

The system 1100 can include one or more content analysis modules 1170. The content analysis module(s) 1170 can be configured to receive visual content, signals, information, and/or data from the visual content device(s) 1160. The content analysis module(s) 1170 can be configured to analyze the received visual content, signals, information, and/or data from the visual content device(s) 1160. In particular, the content analysis module(s) 1170 can be configured to analyze the received visual content, signals, information, and/or data to identify movement within the visual content. The content analysis module(s) 1170 can do so in any suitable manner, now known or later developed. The content analysis module(s) 1170 can incorporate any type of ride simulator or motion simulator technology, now known or later developed.

For instance, the content analysis module(s) 1170 can be configured to analyze the movement of the visual content overall or based on the movement of one or more objects or items in the visual content. In some arrangements, the content analysis module(s) 1170 can be configured to analyze signals, information, or data associated with the visual content indicative of movement. The content analysis module(s) 1170 can include any suitable hardware and/or software to receive and process signals from the visual content device(s) 1160.

The content analysis module(s) 1170 can be configured to determine a corresponding chair movement. Such determining can be performed in real-time based on the visual content presented on the display(s) 1165. The corresponding chair movement can be a movement of the seat portion 104, or the rest of the chair 100 located above the upper platform 112. The corresponding chair movement can be synchronized with at least a portion of the visual content. For example, if the content analysis module(s) 1170 determines that the visual content includes movement that corresponds to a rightward titling of the chair 100. As another example, if the content analysis module(s) 1170 determines that the visual content includes moving over rough terrain or train tracks, the content analysis module(s) 1170 can determine that a vibration movement of the chair 100 is the corresponding chair movement.

The content analysis module(s) 1170 can be configured to take into account the point of view of the visual content presented on the display(s) 1165. For instance, the content analysis module(s) 1170 can assess whether the visual content is presented point of view (POV) style. In such case, the content analysis module(s) 1170 can determine corresponding movements that align with the movement presented on the display(s) 1165. The content analysis module(s) 1170 can assess whether the visual content is presented from some other point of view. In some instances, the corresponding chair movements may not necessarily align (e.g., be in the same direction or side) as the movement presented on the display(s) 1165. The content analysis module(s) 1170 can be configured to take into account human physiology processes and responses to motion.

The system 1100 can include one or more chair control modules 1180. The chair control module(s) 1180 can be configured to receive signals, data, information, and/or other inputs from the content analysis module(s) 1170. The chair control module(s) 1180 can be configured to analyze these signals, data, information, and/or other inputs. The chair control module(s) 1180 can be configured to select one or more of the plurality of actuators 200 to be activated or deactivated to achieve the corresponding chair movement. In some arrangements, the chair control module(s) 1180 can be configured to select an appropriate one of the actuation profiles 1122 in the data store(s) 1120 to effectuate the corresponding chair movement. Alternatively or additionally, the chair control module(s) 1180 can be configured to detect user inputs (e.g., commands) provided on the input interface(s) 1150.

The chair control module(s) 1180 can be configured to cause the selected one or actuators to be activated or deactivated by activating or deactivating the respective shape memory material member(s) 280 associated with the selected actuator(s) 200. As used herein, "cause" or "causing" means to make, force, compel, direct, command, instruct, and/or enable an event or action to occur or at least be in a state where such event or action may occur, either in a direct or indirect manner. The chair control module(s) 1180 can selectively provide an activation input to the actuator(s) 200 or, more particularly, to the shape memory material member(s) 280 associated with the selected actuator(s) 200. The chair control module(s) 1180 can selectively permit or prevent the flow of electrical energy from the power source(s) 1140. The chair control module(s) 1180 can be configured to send control signals or commands over a communication network 1190 to the shape memory material member(s) 280.

The chair control module(s) 1180 can selectively activate or deactivate the shape memory material member(s) 280 timed to substantially coincide with the visual content. For instance, when the visual content is a car racing game, the chair control module(s) 1180 can selectively activate or deactivate the shape memory material member(s) 280 to coincide with an in-game event like the car turning.

The actuators 200 can be operatively positioned to cause a movement of the chair 100 or any portion thereof. In some arrangements, the actuators 200 can respond to signals received from the visual content device(s) 1160, to signals from an input device operatively connected to the visual content device(s) 1160, and/or to signals provided on the input interface(s) 1150. The actuators 200 can expand and contract in a sequence or manner that supports, for example, the desired simulated motion presented in the visual content during game play or movie or otherwise requested by the chair occupant. The actuators 200 can provide various types of movement, including, but not limited to, upward and downward movement, forward and backward tilting, and or left and right tilting. In some arrangements, the actuators 200 can be configured to provide other movements, including rectilinear forward and rearward movement, rectilinear left and right movement, and/or rotation about a vertical axis. In some arrangements, the actuators 200 can be configured to provide six degrees of freedom (e.g., surge, sway, heave, roll, pitch, and yaw motion). Further, the chair 100 can be configured to provide other tactile motions, such as vibrations, shaking, pulsations, etc.

The various elements of the system 1100 can be communicatively linked to one another or one or more other elements through one or more communication networks 1190. As used herein, the term "communicatively linked" can include direct or indirect connections through a communication channel, bus, pathway or another component or system. A "communication network" means one or more components designed to transmit and/or receive information from one source to another. The data store(s) 1120 and/or one or more other elements of the system 1100 can include and/or execute suitable communication software, which enables the various elements to communicate with each other through the communication network and perform the functions disclosed herein.

The one or more communication networks 1190 can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

Now that the various potential systems, devices, elements and/or components of the chair 100 and the system 1100 have been described, an example of a method of moving a portion of a chair synchronized with visual content will now be described. The method described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Turning to FIG. 10, an example of a method 1000 is shown. At block 1010, visual content can be analyzed to determine a corresponding chair movement. The corresponding chair movement can be synchronized with at least a portion of the visual content. The analyzing can be performed by the content analysis module(s) 1170 and/or the processor(s) 1110.

The analysis of the visual content can be performed continuously, periodically, or at any suitable point. If the visual content does not include a corresponding chair movement, then the method 1000 can return to block 1010 or to some other block. If a corresponding chair movement is determined, the method 1000 can continue to block 1020.

At block 1020, one or more of the plurality of actuators can be selected to achieve the corresponding chair movement. Such selection can be performed by the chair control module(s) 1180 and/or the processors 1110. The method can continue to block 1030.

At block 1030, the selected actuator(s) can be caused to be activated. For instance, an activation input can be caused to be provided to the selected actuator(s). As a result, the selected actuator(s) can be activated, which, in turn, can cause the chair to move according to the corresponding chair movement. Causing the activation input to be provided can be performed by the chair control module(s) 1180 and/or the processor(s) 1110. For instance, the chair control module(s) 1180 and/or the processor(s) 1110 can cause or allow the flow of electrical energy from the power sources(s) 1140 to the shape memory material member(s) of the selected actuator(s).

The method 1000 can end. Alternatively, the method 1000 can return to block 1010 or some other block.

Figure 9:
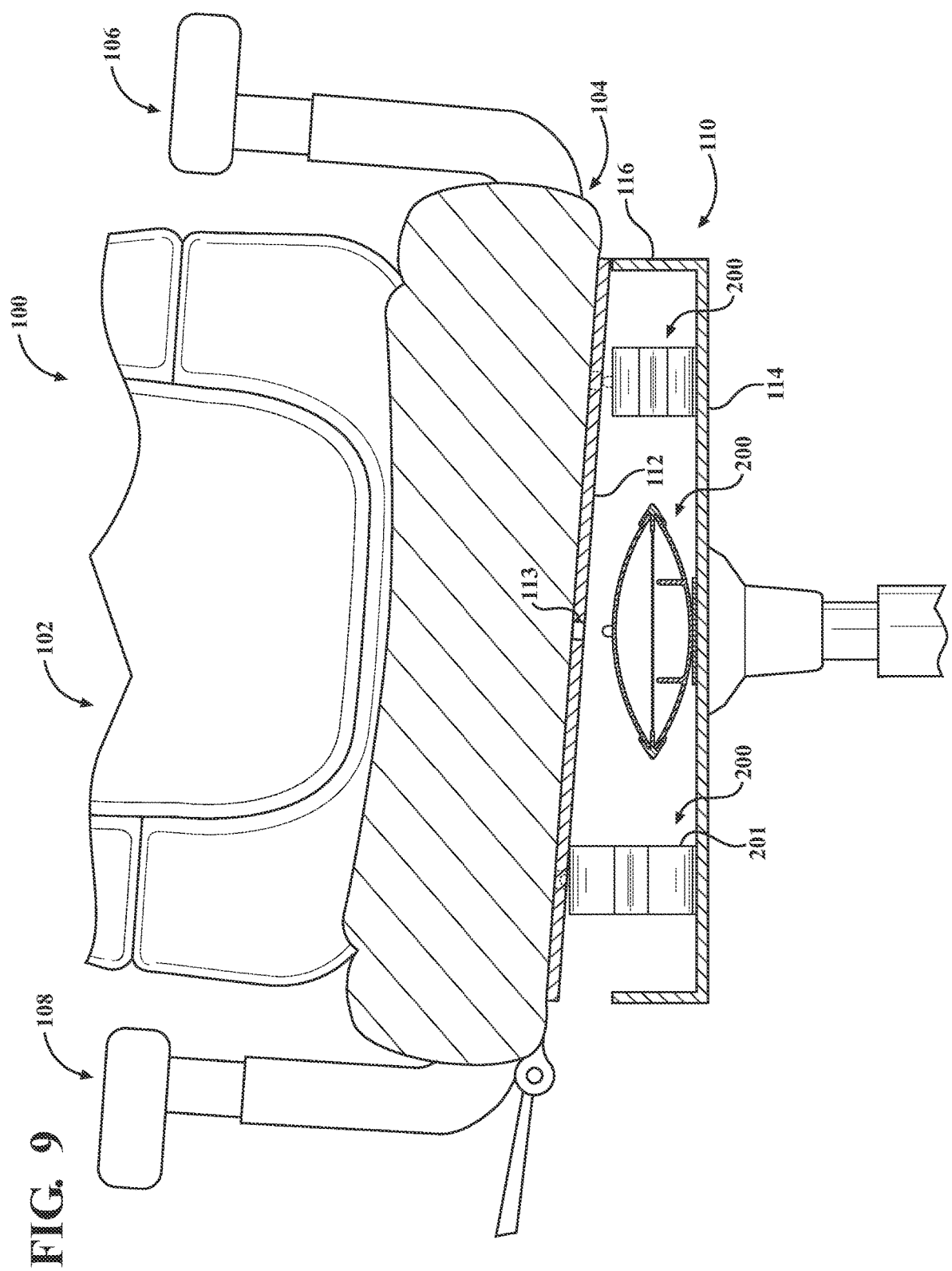
FIG. 9 is a view of the chair, showing a tilting of the chair due to the actuator of a subset of the plurality of actuators.

A non-limiting example of the operation of the arrangements described herein will now be presented in connection to FIGS. 2 and 9. FIG. 2 shows an example of the chair in a non-activated condition, and FIG. 9 shows an example of the chair in an activated condition. While a person would normally be sitting in the chair, the person is not shown in these drawings for clarity. For purposes of this example, the actuators can be arranged in a substantially rectangular configuration, such as is shown in FIG. 3.

An occupant of the chair can be playing a video game. The video game can be in the nature of a flight simulator, presented from the viewpoint of the player. As the person plays the game, the aircraft may be operated by the player to tilt to the left. As a result, in the game, the aircraft can tilt to the left and the corresponding view of the display will show such motion. Such motion in the game play can be detected by the content analysis module(s) and/or the processor(s). As a result, the content analysis module(s) and/or the processor(s) can determine that there should be a corresponding chair movement to synchronize with the displayed visual content.

The content analysis module(s) 1170 and/or processor(s) 1110 can select the appropriate actuator(s) 200 to achieve the corresponding chair movement. In this instance, the content analysis module(s) 1170 and/or the processor(s) 1110 can select the actuator 201 for activation.

The content analysis module(s) 1170 can alert the chair control module(s) 1180 of the selected actuator 201. The chair control module(s) 1180 can cause an activation input to be provided to the selected actuator 201. Here, the chair control module(s) 1180 can allow electrical energy from the power source(s) 1140 to be supplied to the shape memory material member(s) 280 of the selected actuator 201. As a result, the actuator 201 can morph into the activated configuration, as shown in FIG. 9 (see also FIG. 8). The second dimension 295, corresponding to the height, of the actuator 201 will be greater than the height of the other actuators 200. Thus, the chair 100 can be tilted to the left, as is shown in FIG. 9. The chair control module(s) 1180 can cause such tilting to occur in a synchronized manner with the video game. Thus, the tilting can occur substantially simultaneously with the tilting in the video game. Further, the degree and/or the duration of the tilting can correspond to the degree and/or duration of the tilting in the video game. In some arrangements, the actuator(s) 200 can be configured to provide a lift force of more than 38 Newton (N).

It will be appreciated that arrangements described herein can provide numerous benefits, including one or more of the benefits mentioned herein. For example, arrangements described herein can provide an enhanced visual content experience. Arrangements described herein can provide a haptic '4-dimensional experience' to a chair occupant. Arrangements described herein can provide chair movements that are timed with motion in visual content being presented to the person. Arrangements described herein can cause chair movements triggered by a video game or movie being watched. Arrangements described herein can allow for a simpler product. Arrangements described herein do not require electric motors with gears or a pneumatic compressor system.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should be also noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC, or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope hereof.

What is claimed is:

1. A chair, comprising:
a platform;
a seat portion supported on the platform; and
actuators operatively connected to the platform, each actuator including a shape memory material member, each actuator being configured such that, when an activation input is provided to the shape memory material member, the shape memory material member contracts to cause the actuator to morph into an activated configuration in which a height of the actuator increases, the actuators being operatively positioned to cause a movement of the entire seat portion by engaging the platform when selectively activated, each actuator including a rib on an inner side thereof.

2. The chair of claim 1, wherein the actuators are arranged in a substantially rectangular pattern.

3. The chair of claim 1, wherein the actuators are arranged in an offsetting substantially parallel pattern.

4. The chair of claim 1, wherein the actuators are arranged in a substantially radial pattern.

5. The chair of claim 1, wherein the shape memory material member is a shape memory alloy wire.

6. The chair of claim 1, wherein each actuator includes:
a first endcap;
a second endcap positioned opposite the first endcap, wherein the shape memory material member is operatively connected to the first endcap and the second endcap;
a first outer member, the first outer member being bowed, the first outer member including a first end and a second end, the first end being operatively connected to the first endcap and the second end being operatively connected to the second endcap; and
a second outer member, the second outer member being bowed, the second outer member including a first end and a second end, the first end being operatively connected to the first endcap and the second end being operatively connected to the second endcap,
wherein the first and second outer members are made of a flexible material and are arranged on opposite sides of the shape memory material member, the first outer member is located above the second outer member.

7. The chair of claim 6, wherein the platform is supported on the actuators, wherein the platform includes apertures, wherein each of the apertures receives a protrusion of a respective one of the actuators, and wherein the protrusion extends from the first outer member.

8. The chair of claim 6, wherein the actuator includes a base, and wherein the base is operatively connected to the second outer member.

9. The chair of claim 1, wherein the chair is a gaming chair.

10. A system, comprising:
a chair including a platform and a seat portion supported on the platform;
actuators operatively connected to the platform, each actuator including a shape memory material member, each actuator being configured such that, when an activation input is provided to the shape memory material member, the shape memory material contracts to cause the actuator to morph into an activated configuration in which a height of the actuator increases, the actuators being selectively actuatable and operatively positioned to cause a movement of the entire seat portion by engaging the platform, each actuator including a rib on an inner side thereof; and
a processor configured to selectively activate one or more of the actuators by causing the activation input to be provided to the shape memory material member of at least one of the actuators.

11. The system of claim 10, further including:
a display operatively connected to the processor, the display being configured to present visual content thereon.

12. The system of claim 11, wherein the processor is further configured to:
analyze visual content to determine a corresponding chair movement, the corresponding chair movement being synchronized with at least a portion of the visual content;
select one or more of the actuators to achieve the corresponding chair movement; and
causing an activation input to be provided to the selected one or more of the actuators, whereby the selected one or more of the actuators are activated to cause the seat portion to move according to the corresponding chair movement.

13. The system of claim 10, further including:
a power source operatively connected to supply electrical energy to the shape memory material member of each actuator, wherein the processor is operatively connected to the power source, wherein the processor is configured to selectively control a supply of electrical energy to the shape memory material member.

14. The system of claim 10, wherein the actuators are arranged in one of: a substantially rectangular pattern, an offsetting substantially parallel pattern, and a substantially radial pattern.

15. The system of claim 10, wherein the shape memory material member is a shape memory alloy wire.

16. The system of claim 10, wherein each actuator includes:
   a first endcap;
   a second endcap positioned opposite the first endcap, wherein the shape memory material member is operatively connected to the first endcap and the second endcap;
   a first outer member, the first outer member being bowed, the first outer member including a first end and a second end, the first end being operatively connected to the first endcap and the second end being operatively connected to the second endcap; and
   a second outer member, the second outer member being bowed, the second outer member including a first end and a second end, the first end being operatively connected to the first endcap and the second end being operatively connected to the second endcap,
   wherein the first and second outer members are made of a flexible material and are arranged on opposite sides of the shape memory material member, the first outer member is located above the second outer member.

17. The system of claim 10, wherein the chair is a gaming chair.

18. A method of moving a portion of a chair synchronized with visual content, the chair including a platform, a seat portion supported on the platform, and actuators operatively connected to the platform, the method comprising:
   analyzing visual content to determine a corresponding chair movement, the corresponding chair movement being synchronized with at least a portion of the visual content;
   selecting one or more of the actuators to achieve the corresponding chair movement; and
   causing an activation input to be provided to the selected one or more of the actuators, whereby the selected one or more of the actuators are activated to cause the entire seat portion to move according to the corresponding chair movement,
   each actuator including a shape memory material member, each actuator being configured such that, when an activation input is provided to the shape memory material member, the shape memory material member contracts to cause the actuator to morph into an activated configuration in which a height of the actuator increases, the actuators being operatively positioned to cause a movement of the entire seat portion by engaging the platform when selectively activated, each actuator including a rib on an inner side thereof.

19. The method of claim 18, wherein causing the activation input to be provided to the selected one or more of the actuators includes causing electrical energy from a power source to be supplied to the shape memory material member.

20. The method of claim 18, further including:
   discontinuing the activation input to the selected one or more of the actuators.

21. A system, comprising:
   a chair including a platform including apertures and a seat portion supported on the platform;
   actuators operatively connected to the platform, each actuator including a shape memory material member configured such that, responsive to receiving an activation input, the shape memory material contracts to cause the actuator to morph into an activated configuration in which a height of the actuator increases, the actuators being selectively actuatable and operatively positioned to cause a movement of the entire seat portion by engaging the platform, a protrusion extending from an outer surface of each actuator, each protrusion being received in a respective one of the apertures; and
   a processor configured to:
      analyze visual content on a display to determine a corresponding chair movement synchronized with at least a portion of the visual content;
      select one or more of the actuators to achieve the corresponding chair movement; and
      causing an activation input to be provided to the selected one or more of the actuators to cause the seat portion to move according to the corresponding chair movement including tilting, rocking, moving up, or moving down.

22. The method of claim 18, wherein the corresponding chair movement includes tilting, rocking, moving up, or moving down.

23. The system of claim 12, wherein the corresponding chair movement includes tilting, rocking, moving up, or moving down.

24. The system of claim 10, wherein the platform includes apertures, wherein each of the apertures receives a protrusion of a respective one of the actuators, and wherein the protrusion extends from an outer surface of the actuator.

* * * * *